US010482595B2

(12) United States Patent
Yorav-Raphael et al.

(10) Patent No.: US 10,482,595 B2
(45) Date of Patent: Nov. 19, 2019

(54) SYSTEM AND METHOD FOR CALCULATING FOCUS VARIATION FOR A DIGITAL MICROSCOPE

(71) Applicant: S.D. Sight Diagnostics Ltd, Tel Aviv (IL)

(72) Inventors: Noam Yorav-Raphael, Jerusalem (IL); Uri Wolfovitz, Haifa (IL); Joseph Joel Pollak, Neve Daniel (IL)

(73) Assignee: S.D. Sight Diagnostics Ltd., Jerusalem (IL)

( * ) Notice: Subject to any disclaimer, the term of this patent is extended or adjusted under 35 U.S.C. 154(b) by 195 days.

(21) Appl. No.: 15/506,997

(22) PCT Filed: Aug. 27, 2015

(86) PCT No.: PCT/IL2015/050864
§ 371 (c)(1),
(2) Date: Feb. 27, 2017

(87) PCT Pub. No.: WO2016/030897
PCT Pub. Date: Mar. 3, 2016

(65) Prior Publication Data
US 2019/0087953 A1 Mar. 21, 2019

Related U.S. Application Data

(60) Provisional application No. 62/042,388, filed on Aug. 27, 2014.

(51) Int. Cl.
*G06K 9/00* (2006.01)
*G06T 7/00* (2017.01)
(Continued)

(52) U.S. Cl.
CPC .......... *G06T 7/0012* (2013.01); *G02B 21/244* (2013.01); *G06T 7/0002* (2013.01);
(Continued)

(58) Field of Classification Search
None
See application file for complete search history.

(56) References Cited

U.S. PATENT DOCUMENTS

| 3,603,156 | A | 9/1971 | Konkol |
| 3,676,076 | A | 7/1972 | Grady |

(Continued)

FOREIGN PATENT DOCUMENTS

| CA | 2655024 C | 11/2014 |
| CN | 101403650 | 6/2010 |

(Continued)

OTHER PUBLICATIONS

Sheikh et al., "Blood Cell Identification Using Neural Networks", IEEE, 1996 (p. 119-120), 2 pages total.

(Continued)

*Primary Examiner* — Shervin K Nakhjavan
(74) *Attorney, Agent, or Firm* — Sughrue Mion, PLLC

(57) ABSTRACT

A digital microscopy method, comprising: obtaining data representative of a series of images of at least a portion of a cell sample, the images being captured by performing a depth scan using a digital microscope, the series of images being associated with a series of depth levels of the cell sample, wherein the portion encompasses a mapping field, and the mapping field comprises a plurality of focus analysis regions; and calculating, using the images, a focus configuration for at least two of the focus analysis regions within the mapping field, giving rise to data indicative of focus variations within the mapping field.

27 Claims, 13 Drawing Sheets

(51) Int. Cl.
*G02B 21/24* (2006.01)
*G06T 7/90* (2017.01)

(52) U.S. Cl.
CPC ...... *G06T 7/90* (2017.01); *G06T 2207/10056* (2013.01); *G06T 2207/10061* (2013.01); *G06T 2207/30072* (2013.01); *G06T 2207/30168* (2013.01)

(56) References Cited

U.S. PATENT DOCUMENTS

| | | | |
|---|---|---|---|
| 3,786,184 A * | 1/1974 | Pieters | G02B 27/40 |
| | | | 250/204 |
| 3,967,056 A | 6/1976 | Yata et al. | |
| 4,076,419 A | 2/1978 | Kleker | |
| 4,209,548 A | 6/1980 | Bacus | |
| 4,350,884 A | 9/1982 | Dieter | |
| 4,454,235 A | 6/1984 | Johnson | |
| 4,494,479 A | 1/1985 | Drury et al. | |
| 4,580,895 A | 4/1986 | Patel | |
| 4,700,298 A | 10/1987 | Palcic et al. | |
| 4,761,381 A | 8/1988 | Blatt et al. | |
| 4,774,192 A | 9/1988 | Terminiello et al. | |
| 4,803,352 A | 2/1989 | Bierleutgeb | |
| 4,849,340 A | 7/1989 | Oberhardt | |
| 4,902,101 A | 2/1990 | Fujihara et al. | |
| 5,001,067 A | 3/1991 | Coleman et al. | |
| 5,064,282 A | 11/1991 | Curtis | |
| 5,229,265 A | 7/1993 | Tometsko | |
| 5,300,779 A | 4/1994 | Hillman et al. | |
| 5,331,958 A | 7/1994 | Oppenheimer | |
| 5,430,542 A | 7/1995 | Shepherd et al. | |
| 5,672,861 A | 9/1997 | Fairley et al. | |
| 5,674,457 A | 10/1997 | Williamsson et al. | |
| 5,745,804 A | 4/1998 | Iwane | |
| 5,782,770 A | 7/1998 | Mooradian et al. | |
| 5,834,217 A | 11/1998 | Levine et al. | |
| 5,932,872 A | 8/1999 | Price | |
| 5,948,686 A | 9/1999 | Wardlaw | |
| 5,985,595 A | 11/1999 | Krider et al. | |
| 6,027,695 A | 2/2000 | Oldenburg et al. | |
| 6,064,474 A | 5/2000 | Lee et al. | |
| 6,074,879 A | 6/2000 | Zelmanovic et al. | |
| 6,101,404 A | 8/2000 | Yoon et al. | |
| 6,262,798 B1 | 7/2001 | Shepherd et al. | |
| 6,320,979 B1 | 11/2001 | Melen | |
| 6,350,613 B1 | 2/2002 | Wardlaw et al. | |
| 6,448,024 B1 | 9/2002 | Bruegger | |
| 6,554,788 B1 | 4/2003 | Hunley et al. | |
| 6,582,964 B1 | 6/2003 | Samsoondar et al. | |
| 6,611,777 B2 | 8/2003 | Samsoondar | |
| 6,632,681 B1 | 10/2003 | Chu | |
| 6,658,143 B2 | 12/2003 | Hansen et al. | |
| 6,664,528 B1 | 12/2003 | Cartlidge et al. | |
| 6,711,516 B2 | 3/2004 | Samsoondar | |
| 6,819,408 B1 | 11/2004 | Scrivens et al. | |
| 6,831,733 B2 | 12/2004 | Pettersson et al. | |
| 6,834,237 B2 | 12/2004 | Noergaard et al. | |
| 6,836,559 B2 | 12/2004 | Abdel-Fattah et al. | |
| 6,842,233 B2 | 1/2005 | Narisada et al. | |
| 6,866,823 B2 | 3/2005 | Wardlaw | |
| 6,872,930 B2 | 3/2005 | Cartlidge et al. | |
| 6,903,323 B2 | 6/2005 | Cartlidge et al. | |
| 6,929,953 B1 | 8/2005 | Wardlaw | |
| 6,949,384 B2 | 9/2005 | Samsoondar | |
| 6,956,650 B2 | 10/2005 | Boas et al. | |
| 6,989,891 B2 | 1/2006 | Braig et al. | |
| 7,027,628 B1 * | 4/2006 | Gagnon | G01N 15/1463 |
| | | | 382/128 |
| 7,030,351 B2 | 4/2006 | Wasserman et al. | |
| 7,034,883 B1 | 4/2006 | Rosenqvist | |
| 7,105,795 B2 | 9/2006 | Cartlidge et al. | |
| 7,132,636 B1 | 11/2006 | Cartlidge et al. | |
| 7,133,547 B2 | 11/2006 | Marcelpoil et al. | |
| 7,151,246 B2 | 12/2006 | Fein et al. | |
| 7,155,049 B2 * | 12/2006 | Wetzel | G01B 7/003 |
| | | | 382/133 |
| 7,248,716 B2 | 7/2007 | Fein et al. | |
| 7,274,810 B2 | 9/2007 | Reeves et al. | |
| 7,283,217 B2 | 10/2007 | Ikeuchi et al. | |
| 7,288,751 B2 | 10/2007 | Cartlidge et al. | |
| 7,305,109 B1 * | 12/2007 | Gagnon | G01N 15/1463 |
| | | | 382/128 |
| 7,324,694 B2 | 1/2008 | Chapoulaud et al. | |
| 7,329,537 B2 | 2/2008 | Qiu | |
| 7,338,168 B2 | 3/2008 | Cartlidge et al. | |
| 7,344,890 B2 | 3/2008 | Perez et al. | |
| 7,346,205 B2 | 3/2008 | Walker, Jr. | |
| 7,369,696 B2 | 5/2008 | Arini et al. | |
| 7,411,680 B2 | 8/2008 | Chang et al. | |
| 7,417,213 B2 | 8/2008 | Krief et al. | |
| 7,385,168 B2 | 9/2008 | Cartlidge et al. | |
| 7,439,478 B2 | 10/2008 | Cartlidge et al. | |
| 7,450,223 B2 | 11/2008 | Ikeuchi et al. | |
| 7,450,762 B2 | 11/2008 | Morell | |
| 7,460,222 B2 | 12/2008 | Kalveram et al. | |
| 7,493,219 B1 | 2/2009 | Qi et al. | |
| 7,580,120 B2 | 8/2009 | Hamada et al. | |
| 7,599,893 B2 | 10/2009 | Sapir et al. | |
| 7,601,938 B2 | 10/2009 | Cartlidge et al. | |
| 7,602,954 B2 | 10/2009 | Marcelpoil et al. | |
| 7,605,356 B2 | 10/2009 | Krief et al. | |
| 7,609,369 B2 | 10/2009 | Simon-Lopez | |
| 7,630,063 B2 | 12/2009 | Padmanabhan et al. | |
| 7,633,604 B2 | 12/2009 | Ikeuchi et al. | |
| 7,638,748 B2 | 12/2009 | Krief et al. | |
| 7,663,738 B2 | 2/2010 | Johansson | |
| 7,668,362 B2 * | 2/2010 | Olson | G02B 21/002 |
| | | | 382/128 |
| 7,692,131 B2 | 4/2010 | Fein et al. | |
| 7,697,764 B2 | 4/2010 | Kataoka | |
| 7,702,181 B2 | 4/2010 | Gouch | |
| 7,706,862 B2 | 4/2010 | Alfano et al. | |
| 7,713,474 B2 | 5/2010 | Schulman et al. | |
| 7,747,153 B2 | 6/2010 | Ibaraki | |
| 7,765,069 B2 | 6/2010 | Ostoich et al. | |
| 7,777,869 B2 | 8/2010 | Nerin et al. | |
| 7,787,109 B2 | 8/2010 | Dosmann et al. | |
| 7,863,552 B2 | 1/2011 | Cartlidge et al. | |
| 7,869,009 B2 | 1/2011 | Dosmann et al. | |
| 7,894,047 B2 | 2/2011 | Hamada et al. | |
| 7,911,617 B2 | 3/2011 | Padmanabhan et al. | |
| 7,925,070 B2 | 4/2011 | Sumida et al. | |
| 7,929,121 B2 | 4/2011 | Wardlaw et al. | |
| 7,933,435 B2 | 4/2011 | Hunter et al. | |
| 7,936,913 B2 | 5/2011 | Nordell et al. | |
| 7,951,599 B2 | 5/2011 | Levine et al. | |
| 7,995,200 B2 | 8/2011 | Matsumoto | |
| 7,998,435 B2 | 8/2011 | Reed | |
| 8,000,511 B2 | 8/2011 | Perz | |
| 8,044,974 B2 | 10/2011 | Sumida et al. | |
| 8,045,782 B2 | 10/2011 | Li et al. | |
| 8,055,471 B2 | 11/2011 | Qi et al. | |
| 8,064,680 B2 | 11/2011 | Ramoser et al. | |
| 8,077,296 B2 | 12/2011 | Wardlaw et al. | |
| 8,081,303 B2 | 12/2011 | Levine et al. | |
| 8,105,554 B2 | 1/2012 | Kanigan et al. | |
| D655,421 S | 3/2012 | Lee et al. | |
| 8,131,035 B2 | 3/2012 | Grady et al. | |
| 8,131,052 B2 | 3/2012 | Alexandrov | |
| 8,150,114 B2 | 4/2012 | Svanberg et al. | |
| 8,154,713 B2 | 4/2012 | Simon-Lopez | |
| 8,165,385 B2 | 4/2012 | Reeves et al. | |
| 8,175,353 B2 | 5/2012 | Westphal et al. | |
| 8,184,273 B2 | 5/2012 | Dosmann et al. | |
| 8,216,832 B2 | 7/2012 | Battrell et al. | |
| 8,224,058 B2 | 7/2012 | Lindberg et al. | |
| 8,269,954 B2 | 9/2012 | Levine et al. | |
| 8,280,134 B2 | 10/2012 | Hoyt | |
| 8,310,659 B2 | 11/2012 | Wardlaw et al. | |
| 8,320,655 B2 | 11/2012 | Sarachan et al. | |
| 8,331,642 B2 | 12/2012 | Zerfass et al. | |
| 8,339,586 B2 | 12/2012 | Zahniser et al. | |
| 8,345,227 B2 | 1/2013 | Zahniser et al. | |

(56) References Cited

U.S. PATENT DOCUMENTS

| | | | |
|---|---|---|---|
| 8,351,676 B2 | 1/2013 | Dai et al. | |
| 8,363,221 B2 | 1/2013 | Hansen et al. | |
| 8,379,944 B2 | 2/2013 | Grady et al. | |
| 8,428,331 B2 | 4/2013 | DiMarzio et al. | |
| 8,432,392 B2 | 4/2013 | Kim et al. | |
| 8,477,294 B2 | 7/2013 | Zahniser et al. | |
| 8,481,303 B2 | 7/2013 | Faris et al. | |
| 8,488,111 B2 | 7/2013 | Zahniser et al. | |
| 8,491,499 B2 | 7/2013 | Choi et al. | |
| 8,526,704 B2 | 9/2013 | Dobbe | |
| 8,570,496 B2 | 10/2013 | Chen | |
| 8,582,924 B2 | 11/2013 | De La Torre-Bueno et al. | |
| 8,638,427 B2 | 1/2014 | Wardlaw et al. | |
| 8,712,142 B2 | 4/2014 | Rajpoot et al. | |
| 8,736,824 B2 | 5/2014 | Matsui et al. | |
| 8,744,165 B2 | 6/2014 | Liu et al. | |
| 8,778,687 B2 | 7/2014 | Levine et al. | |
| 8,792,693 B2 | 7/2014 | Satish et al. | |
| 8,849,024 B2 | 9/2014 | Shinoda et al. | |
| 8,873,827 B2 | 10/2014 | McCulloch et al. | |
| 8,877,458 B2 | 11/2014 | Maurer | |
| 8,878,923 B2 | 11/2014 | Henderson et al. | |
| 8,885,154 B2 | 11/2014 | Wardlaw et al. | |
| 8,885,912 B2 | 11/2014 | Sui | |
| 8,922,761 B2 | 12/2014 | Zahniser et al. | |
| 8,942,458 B2 | 1/2015 | Takahashi et al. | |
| 8,964,171 B2 | 2/2015 | Zahniser et al. | |
| 8,994,930 B2 | 3/2015 | Levine et al. | |
| 9,012,868 B2 | 4/2015 | Courtney et al. | |
| 9,041,792 B2 | 5/2015 | Van Leeuwen et al. | |
| 9,046,473 B2 | 6/2015 | Levine et al. | |
| 9,050,595 B2 | 6/2015 | Miller et al. | |
| 9,186,843 B2 | 11/2015 | Chan et al. | |
| 9,240,043 B2 | 1/2016 | Christiansen et al. | |
| 9,329,129 B2 | 5/2016 | Pollak et al. | |
| 9,404,852 B2 | 8/2016 | Braig et al. | |
| 9,470,609 B2 | 10/2016 | Wimberger-Friedl et al. | |
| 9,477,875 B2 | 10/2016 | Ohya et al. | |
| 9,522,396 B2 | 12/2016 | Bachelet et al. | |
| 9,588,033 B2 | 3/2017 | Zahniser et al. | |
| 9,934,571 B2 | 4/2018 | Ozaki et al. | |
| 10,061,972 B2 | 8/2018 | Champlin et al. | |
| 10,093,957 B2 | 10/2018 | Pollak et al. | |
| 10,176,565 B2 | 1/2019 | Greenfield et al. | |
| 2002/0009711 A1 | 1/2002 | Wada et al. | |
| 2002/0028158 A1 | 3/2002 | Wardlaw | |
| 2002/0028471 A1 | 3/2002 | Oberhardt | |
| 2003/0017085 A1 | 1/2003 | Kercso et al. | |
| 2003/0161514 A1 | 8/2003 | Curry | |
| 2003/0197925 A1 | 10/2003 | Hamborg | |
| 2003/0224522 A1 | 12/2003 | de Jong et al. | |
| 2003/0227612 A1 | 12/2003 | Fein et al. | |
| 2003/0227673 A1* | 12/2003 | Nakagawa | G02B 21/241 359/380 |
| 2004/0132171 A1 | 7/2004 | Rule et al. | |
| 2004/0170312 A1 | 9/2004 | Soenksen | |
| 2004/0185447 A1 | 9/2004 | Maples et al. | |
| 2004/0218804 A1 | 11/2004 | Affleck et al. | |
| 2004/0240050 A1 | 12/2004 | Ogihara | |
| 2004/0241677 A1 | 12/2004 | Lin et al. | |
| 2005/0089208 A1* | 4/2005 | Dong | G02B 21/241 382/133 |
| 2005/0109959 A1 | 5/2005 | Wasserman et al. | |
| 2005/0286800 A1 | 12/2005 | Gouch | |
| 2006/0045505 A1* | 3/2006 | Zeineh | G02B 21/365 396/89 |
| 2006/0063185 A1 | 3/2006 | Vannier | |
| 2006/0187442 A1 | 8/2006 | Chang et al. | |
| 2006/0223052 A1 | 10/2006 | MacDonald et al. | |
| 2006/0223165 A1 | 10/2006 | Chang et al. | |
| 2007/0054350 A1 | 3/2007 | Walker | |
| 2007/0243117 A1 | 10/2007 | Wardlaw | |
| 2007/0252984 A1 | 11/2007 | Van Beek et al. | |
| 2008/0020128 A1* | 1/2008 | van Ryper | G01N 1/312 427/2.11 |
| 2008/0187466 A1 | 8/2008 | Wardlaw | |
| 2008/0212069 A1 | 9/2008 | Goldberg et al. | |
| 2008/0273776 A1 | 11/2008 | Krief et al. | |
| 2008/0305514 A1 | 12/2008 | Alford et al. | |
| 2009/0066934 A1 | 3/2009 | Gao et al. | |
| 2009/0075324 A1 | 3/2009 | Pettersson | |
| 2009/0185734 A1 | 7/2009 | Lindberg et al. | |
| 2009/0191098 A1 | 7/2009 | Beard et al. | |
| 2009/0195688 A1 | 8/2009 | Henderson et al. | |
| 2009/0213214 A1* | 8/2009 | Yamada | G01N 21/6458 348/80 |
| 2009/0258347 A1 | 10/2009 | Scott | |
| 2009/0269799 A1 | 10/2009 | Winkelman et al. | |
| 2010/0112631 A1 | 5/2010 | Hur et al. | |
| 2010/0120129 A1 | 5/2010 | Amshey et al. | |
| 2010/0152054 A1 | 6/2010 | Love | |
| 2010/0157086 A1 | 6/2010 | Segale et al. | |
| 2010/0172020 A1* | 7/2010 | Price | G02B 21/0016 359/381 |
| 2010/0254596 A1* | 10/2010 | Xiong | G06T 3/4053 382/159 |
| 2010/0256918 A1 | 10/2010 | Chen et al. | |
| 2010/0265323 A1 | 10/2010 | Perz | |
| 2011/0009163 A1 | 1/2011 | Fletcher et al. | |
| 2011/0030458 A1 | 2/2011 | Park et al. | |
| 2011/0102571 A1* | 5/2011 | Yoneyama | G02B 21/367 348/79 |
| 2011/0123398 A1 | 5/2011 | Carrilho et al. | |
| 2011/0149097 A1 | 6/2011 | Danuser et al. | |
| 2011/0151502 A1 | 6/2011 | Kendall et al. | |
| 2011/0178716 A1 | 7/2011 | Krockenberger et al. | |
| 2011/0212486 A1* | 9/2011 | Yamada | G02B 21/365 435/40.5 |
| 2011/0249910 A1* | 10/2011 | Henderson | G06K 9/00134 382/278 |
| 2011/0275111 A1 | 11/2011 | Pettigrew et al. | |
| 2012/0002195 A1 | 1/2012 | Wu et al. | |
| 2012/0021951 A1 | 1/2012 | Hess et al. | |
| 2012/0030618 A1 | 2/2012 | Leong et al. | |
| 2012/0044342 A1* | 2/2012 | Hing | G02B 21/361 348/79 |
| 2012/0058504 A1 | 3/2012 | Li et al. | |
| 2012/0092477 A1* | 4/2012 | Kawano | G02B 21/365 348/79 |
| 2012/0120221 A1 | 5/2012 | Dong et al. | |
| 2012/0169863 A1 | 7/2012 | Bachelet et al. | |
| 2012/0225446 A1 | 9/2012 | Wimberger-Friedl et al. | |
| 2012/0312957 A1 | 12/2012 | Loney et al. | |
| 2012/0320045 A1 | 12/2012 | Yao et al. | |
| 2013/0023007 A1 | 1/2013 | Zahniser et al. | |
| 2013/0130262 A1 | 5/2013 | Battrell et al. | |
| 2013/0176551 A1 | 7/2013 | Wardlaw et al. | |
| 2013/0273968 A1* | 10/2013 | Rhoads | G06K 9/6253 455/556.1 |
| 2013/0284924 A1* | 10/2013 | Mizuochi | G01N 23/2206 250/310 |
| 2013/0290225 A1 | 10/2013 | Kamath et al. | |
| 2014/0139625 A1 | 5/2014 | Mathuis et al. | |
| 2014/0139630 A1 | 5/2014 | Kowalevicz | |
| 2014/0186859 A1* | 7/2014 | Calderwood | G02B 21/26 435/7.32 |
| 2014/0205176 A1 | 7/2014 | Obrien et al. | |
| 2014/0347459 A1 | 11/2014 | Greenfield et al. | |
| 2015/0037806 A1 | 2/2015 | Pollak et al. | |
| 2015/0278575 A1 | 10/2015 | Allano et al. | |
| 2015/0302237 A1 | 10/2015 | Ohya et al. | |
| 2015/0316477 A1 | 11/2015 | Pollak et al. | |
| 2016/0208306 A1 | 7/2016 | Pollak et al. | |
| 2016/0246046 A1 | 8/2016 | Yorav Raphael et al. | |
| 2016/0279633 A1 | 9/2016 | Bachelet et al. | |
| 2017/0052110 A1 | 2/2017 | Malissek et al. | |
| 2017/0160185 A1 | 6/2017 | Minemura et al. | |
| 2017/0307496 A1 | 10/2017 | Zahniser et al. | |
| 2018/0246313 A1 | 8/2018 | Eshel et al. | |

(56) References Cited

U.S. PATENT DOCUMENTS

| | | |
|---|---|---|
| 2018/0296102 A1 | 10/2018 | Satish et al. |
| 2019/0002950 A1 | 1/2019 | Pollak et al. |

FOREIGN PATENT DOCUMENTS

| | | |
|---|---|---|
| EP | 0073551 | 3/1983 |
| EP | 0479231 | 4/1992 |
| EP | 1381229 A1 | 1/2003 |
| EP | 1698883 | 9/2006 |
| EP | 2145684 | 1/2010 |
| EP | 3001174 | 3/2016 |
| JP | 61198204 | 9/1986 |
| JP | H11-73903 A | 3/1999 |
| JP | 2000199845 | 7/2000 |
| JP | 2004/257768 | 9/2004 |
| JP | 2006/301270 | 11/2006 |
| JP | 2007040814 | 2/2007 |
| WO | 96/01438 | 1/1996 |
| WO | 1996/012981 | 5/1996 |
| WO | 2000/055572 | 9/2000 |
| WO | 03/056327 | 7/2003 |
| WO | 2003/073365 | 9/2003 |
| WO | 03/081525 A1 | 10/2003 |
| WO | 2004/111610 | 12/2004 |
| WO | 2005/121863 | 12/2005 |
| WO | 2006/121266 | 11/2006 |
| WO | 2008/063135 | 5/2008 |
| WO | 2010/056740 | 5/2010 |
| WO | 2010/126903 | 11/2010 |
| WO | 2011/123070 A1 | 10/2011 |
| WO | 2011/143075 | 11/2011 |
| WO | 2012/000102 | 1/2012 |
| WO | 2012/030313 | 3/2012 |
| WO | 2012/090198 | 11/2012 |
| WO | 2012/154333 | 11/2012 |
| WO | 2013/098821 | 7/2013 |
| WO | 2014/159620 | 10/2014 |
| WO | 2014/188405 | 11/2014 |
| WO | 2015/001553 | 1/2015 |
| WO | 2015/029032 | 3/2015 |
| WO | 2016/030897 | 3/2016 |
| WO | 2016/030897 A1 | 3/2016 |
| WO | 2017/046799 | 3/2017 |
| WO | 2017/168411 A1 | 10/2017 |
| WO | 2017/195205 A1 | 11/2017 |
| WO | 2017/195208 A1 | 11/2017 |
| WO | 2019/097387 A1 | 5/2019 |

OTHER PUBLICATIONS

Communication dated Jan. 28, 2019, in U.S. Appl. No. 15/174,490.
Communication dated Dec. 21, 2018, in U.S. Appl. No. 14/369,251.
Wissing et al., "Illumination of the Malaria Parasite *Plasmodium falciparum* Alters Intracellular pH", The Journal of Biological Chemistry, vol. 277, No. 40, Oct. 4, 2002 (pp. 37747-37755), 10 pages total.
Le et al., "A novel semi-automatic image processing approach to determine Plasmodium falciparum parasitemia in Giemsa-stained thin blood smears", BMC Cell Biology, Mar. 28, 2008 (pp. 1-12), 12 pages total.
Communication dated Dec. 24, 2018, from Intellectual Property of India in counterpart application No. 3592/MUMNP/2015.
Communication dated Jan. 31, 2019, from Intellectual Property of India in counterpart application No. 5069/DELNP/2012.
Piruska et al., "The autofluorescence of plastic materials and chips measured under laser irradiation", The Royal Society of Chemistry, Lap Chip, vol. 5, 2005 (pp. 1348-1354), 7 pages total.
Communication dated Nov. 16, 2018, in U.S. Appl. No. 14/914,329.
Matcher, S. J., M. Cope, and D. T. Delpy. "Use of the water absorption spectrum to quantify tissue chromophore concentration changes in near-infrared spectroscopy." Physics in medicine and biology 39.1 (1994): 177.
Rappaz, Benjamin, et al. "Comparative study of human erythrocytes by digital holographic microscopy, confocal microscopy, and impedance volume analyzer." Cytometry Part A 73.10 (2008): 895-903.
Ross, Nicholas E., et al. "Automated image processing method for the diagnosis and classification of malaria on thin blood smears." Medical and Biological Engineering and Computing 44.5 (2006): 427-436.
Houri-Yafin, A., et al. "An enhanced computer vision platform for clinical diagnosis of malaria." Malar Control Elimin 5.138.10 (2016): 4172.
Ahirwar, Neetu, Sapnojit Pattnaik, and Bibhudendra Acharya. "Advanced image analysis based system for automatic detection and classification of malarial parasite in blood images." International Journal of Information Technology and Knowledge Management 5.1 (2012): 59-64.
An Office Action dated Aug. 4, 2017, which issued during the prosecution of U.S. Appl. No. 14/369,251.
An Office Action dated Jun. 13, 2017, which issued during the prosecution of U.S. Appl. No. 14/285,672.
An Office Action dated Jul. 11, 2017, which issued during the prosecution of U.S. Appl. No. 15/174,672.
An Office Action dated Jan. 10, 2018, which issued during the prosecution of U.S. Appl. No. 15/083,610.
Communication dated Feb. 22, 2018, in the prosecution of U.S. Appl. No. 14/369,251.
Communication dated Mar. 23, 2018, issued by the Intellectual Property Office of India in co-pending Indian Application No. 4263/DELNP/2014.
Osibote, O. A., et al. "Automated focusing in bright-field microscopy for tuberculosis detection." Journal of microscopy 240.2 (2010): 155-163.
Shen, Feimo, Louis Hodgson, and Klaus Hahn. "Digital autofocus methods for automated microscopy." Methods in enzymology 414 (2006): 620-632.
Wu, Qiang, Fatima Merchant, and Kenneth Castleman. Microscope image processing. Chapter 16, "Autofocusing", pp. 441-467, Academic press, 2010.
Purwar, Yashasvi, et al. "Automated and unsupervised detection of malarial parasites in microscopic images." Malaria journal 10.1 (2011): 364.
Frean, John. "Microscopic determination of malaria parasite load: role of image analysis." Microscopy: Science, technology, Applications, and Education (2010): 862-866.
Price, Jeffrey H., and David A. Gough. "Comparison of phase—contrast and fluorescence digital autofocus for scanning microscopy." Cytometry 16.4 (1994): 283-297.
Vink, J. P.,etal. "An automatic vision based malaria diagnosis system."Journal of microscopy 250.3(2013): 166-178.
Chong, Shau Poh, Shilpa Pant, and Nanguang Chen. "Line-scan focal modulation microscopy for rapid imaging of thick biological specimens." SPIE/OSA/IEEE Asia Communications and Photonics. International Society for Optics and Photonics, 2011.
Yang, Ming, and Li Luo. "A rapid auto-focus method in automatic microscope." Signal Processing, 2008, ICSP 2008. 9th International Conference on. IEEE, 2008.
Anand, A., et al. "Automatic identification of malaria-infected RBC with digital holographic microscopy using correlation algorithms." Photonics Journal, IEEE 4.5 (2012): 1456-1464.
Ortyn, William E., et al. "Extended depth of field imaging for high speed cell analysis." Cytometry Part A 71.4 (2007): 215-231.
Sun, Yu, Stefan Duthaler, and Bradley J. Nelson. "Autofocusing algorithm selection in computer microscopy." Intelligent Robots and Systems, 2005,(IROS 2005). 2005 IEEE/RSJ International Conference on. IEEE, 2005.
Keiser, J., et al. "Acridine Orange for malaria diagnosis: its diagnostic performance, its promotion and implementation in Tanzania, and the implications for malaria control." Annals of tropical medicine and parasitology, 96.7 (2002): 643-654.
Shute, G. T., and T. M. Sodeman. "Identification of malaria parasites by fluorescence microscopy and acridine orange staining." Bulletin of the World Health Organization, 48.5 (1973): 591.

(56) References Cited

OTHER PUBLICATIONS

Kawamoto, Fumihiko, "Rapid diagnosis of malaria by fluorescence microscopy with light microscope and interference filter". The Lancet, vol. 337, pp. 200-202, Jan. 26, 1991.
Emma Eriksson et al: "Automated focusing of nuclei for time lapse experiments on single cells using holographic optical tweezers", Optics Express, vol. 17, No. 7, Mar. 24, 2009, pp. 5585-5594,.
Kawamoto, F. and P. F. Billingsley. "Rapid diagnosis of malaria by fluorescence microscopy." Parasitology today 8.2 (1992): 69-71.
An International Search Report and a Written Opinion both dated Jan. 15, 2016, which issued during the prosecution of Applicant's PCT/IL2015/050864.
Tek, F. Boray, Andrew G. Dempster, and Izzet Kale. "Computer vision for microscopy diagnosis of malaria." Malaria Journal 8.1 (2009): 153.
Bovik, Alan C., ed. "The essential guide to image processing", chapter 27, "Computer assisted Microscopy", pp. 777-831, Academic Press, 2009.
Thung, Ferdian, and Iping Supriana Suwardi. "Blood parasite identification using feature based recognition." Electrical Engineering and Informatics (ICEEI), 2011 International Conference on. IEEE, 2011.
Bacus, J.W., 1985. Cytometric approaches to red blood cells. Pure and Applied Chemistry, 57(4), pp. 593-598.
Centers for Disease Control and Prevention. "DPDx—Laboratory Identification of Parasitic Diseases of Public Health Concern", <http://www.cdc.gov/dpdx/diagnosticProcedures/blood/microexam.html>, Nov. 29, 2013.
An International Search Report and a Written Opinion both dated Feb. 12, 2015, which issued during the prosecution of Applicant's PCT/IL2014/050770.
U.S. Appl. No. 61/870,106, filed Aug. 26, 2013.
The use of fluorescence enhancement to improve the microscopic diagnosis of falciparum malaria Malaria Journal 2007, 6:89 http://www.malariajournal.eom/content/6/1/89 Rebecca Guy, Paul Liu, Peter Pennefather and Ian Crandall (Jul. 6, 2007).
Leif, "Methods for Preparing Sorted Cells as Monolayer Specimens", Springer Lab Manuals, Section 7-Chapter 5, pp. 592-619, (2000).
An Office Action dated Oct. 5, 2016, which issued during the prosecution of U.S. Appl. No. 14/285,672.
Groen F C A et al: "A Comparison of Different Focus Functions for Use in Autofocus Algorithms", Cytometry, Alan Liss, New York, US, vol. 6, No. 2, Mar. 1, 1985 (Mar. 1, 1985), pp. 81-91.
Andrew Gordon et al: "Supplementary Note to Gordon et al: "Single-cell quantification of molecules . . . "", Nature Methods, Jan. 21, 2007, pp. 1-35.
Andrew Gordon et al: "Single-cell quantification of molecules and rates using open-source microscope-based cytometry", HHS Public Access Author Manuscript, vol. 4, No. 2, Jan. 21, 2007, pp. 175-181.
European Search Report dated Dec. 14, 2016, which issued during the prosecution of Applicant's European App No. 14800352.8.
An International Search Report and a Written Opinion both dated Sep. 24, 2014, which issued during the prosecution of Applicant's PCT/IL2014/050423.
An International Search Report and a Written Opinion both dated Apr. 18, 2013, which issued during the prosecution of Applicant's PCT/IL2012/050556.
An International Search Report and a Written Opinion both dated Oct. 30, 2014, which issued during the prosecution of Applicant's PCT/IL2014/050585.
Notice of Allowance dated Jan. 11, 2016, which issued during the prosecution of U.S. Appl. No. 14/440,864.
High-content live cell imaging with RNA probes: advancements in high-throughput antimalarial drug discovery BMC Cell Biology 2009, 10:45 www.biomedcentral.com/1471-2121/10/45 Serena Cervantes, Jacques Prudhomme, David Carter, Krishna G Gopi, Qian Li, Young-Tae Chang and Karine G Le Roch (Jun. 10, 2009).
Plasmodium yoelii: A differential fluorescent technique using Acridine Orange to identify infected erythrocytes and reticulocytes in Duffy knockout mouse. Experimental Parasitology vol. 110, Issue 1, May 2005, pp. 80-87. http://www.sciencedirect.com/science/article/pii/S001448940500038X : Lili Xu, Asok Chaudhuri (May 31, 2005).
Notice of Allowance dated Dec. 30, 2015, which issued during the prosecution of U.S. Appl. No. 14/440,864.
Zahniser et al., Automated Slide Preparation System for the Clinical Laboratory, Cytometry, vol. 26, No. 10, pp. 30-64, (1996).
Moody, "Rapid Diagnostic Tests for Malaria Parasites", Clinical Microbiology Reviews, vol. 15, No. 1, pp. 66-78, (2002).
Knesel, "Roche Image Analysis Systems, Inc.", Acta Cytologica, vol. 40, pp. 60-66, (1996).
Life Technologies Corporation, "Counting blood cells with Countess Automated Cell Counter".pdf, four pages, (2009).
An Office Action dated Mar. 2, 2017, which issued during the prosecution of U.S. Appl. No. 14/369,251.
An International Search Report and a Written Opinion both dated Jan. 23, 2017, which issued during the prosecution of Applicant's PCT/IL2016/051025.
European Search Report dated Mar. 23, 2017, which issued during the prosecution of Applicant's European App No. 14839661.7.
An International Preliminary Report on Patentability dated Feb. 28, 2017, which issued during the prosecution of Applicant's PCT/IL2015/050864.
Roma, P. M. S., et al. "Total three-dimensional imaging of phase objects using defocusing microscopy: Application to red blood cells." Applied Physics Letters 104.25 (2014): 251107.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Bravo-Zanoguera, M.E., Laris, C.A., Nguyen, L.K., Oliva, M. and Price, J.H., 2007. Dynamic autofocus for continuous-scanning time-delay-and-integration image acquisition in automated microscopy. Journal of biomedical optics, 12(3), pp. 034011-034011.
U.S. Appl. No. 62/042,388, filed Aug. 27, 2014.
Laboratory Identification of Cryoglobulinemia From Automated Blood Cell Counts, Fresh Blood Samples, and Blood Films, Fohlen-Walker et al. [Am J Clin Pathol 2002;117:606-614].
Automated Image Detection and Segmentation in Blood Smears, Poon et al. [Cytometry 13:766-774].
An Automated Microscope for Cytologic Research a Preliminary Evaluation, Brenner et al. [The Journal of Histochemistry and Cytochemistry, vol. 24, No. 1, pp. 100-111, 1976.
Simple technique for fluorescence staining of blood cells with acridine orange, Jahanmeher et al., [Journal of clinical pathology, Aug. 1, 1987].
Feasibility study of the spectroscopic measurement of oxyhemoglobin using whole blood without pre-treatment, Wu et al. [Analyst, Mar. 1998, vol. 123 (477-481)].
An International Search Report and Written Opinion dated Apr. 4, 2019 in PCT/IB2018/058861.
A Final Office Action dated Apr. 4, 2019 in U.S. Appl. No. 14/914,329.
C. Briggs, et al., "Continuing developments with the automated platelet count", Blackwell Publishing Ltd, International Journal of Laboratory Hematology, Jan. 18, 2007, pp. 77-91, vol. 29 (15 pages total).

\* cited by examiner

FIG. 6

| Relative focus -20 | Relative focus -15 | Relative focus -10 | Relative focus -5 |
|---|---|---|---|
| Confidence 0 | Confidence 0 | Confidence 0.2 | Confidence 0.8 |
| Relative focus -10 | Relative focus -5 | Relative focus 0 | Relative focus 5 |
| Confidence 0.2 | Confidence 0.8 | Confidence 1 | Confidence 0.8 |
| Relative focus -0 | Relative focus 5 | Relative focus 10 | Relative focus 15 |
| Confidence 1 | Confidence 0.8 | Confidence 0.2 | Confidence 0 |

610

$$\text{Var}(I) = E[(I_{i,j} - E[I])^2]$$

| | 1 | 2 | ... | ... | ... | n |
|---|---|---|---|---|---|---|
| 1 | $I_{1,1}$ | $I_{1,2}$ | | | | $I_{1,n}$ |
| 2 | $I_{2,1}$ | | | | | |
| : | | | | | | |
| : | | | | | | |
| : | | | | | | |
| p | $I_{p,1}$ | | | | | $I_{p,n}$ |

FIG. 8

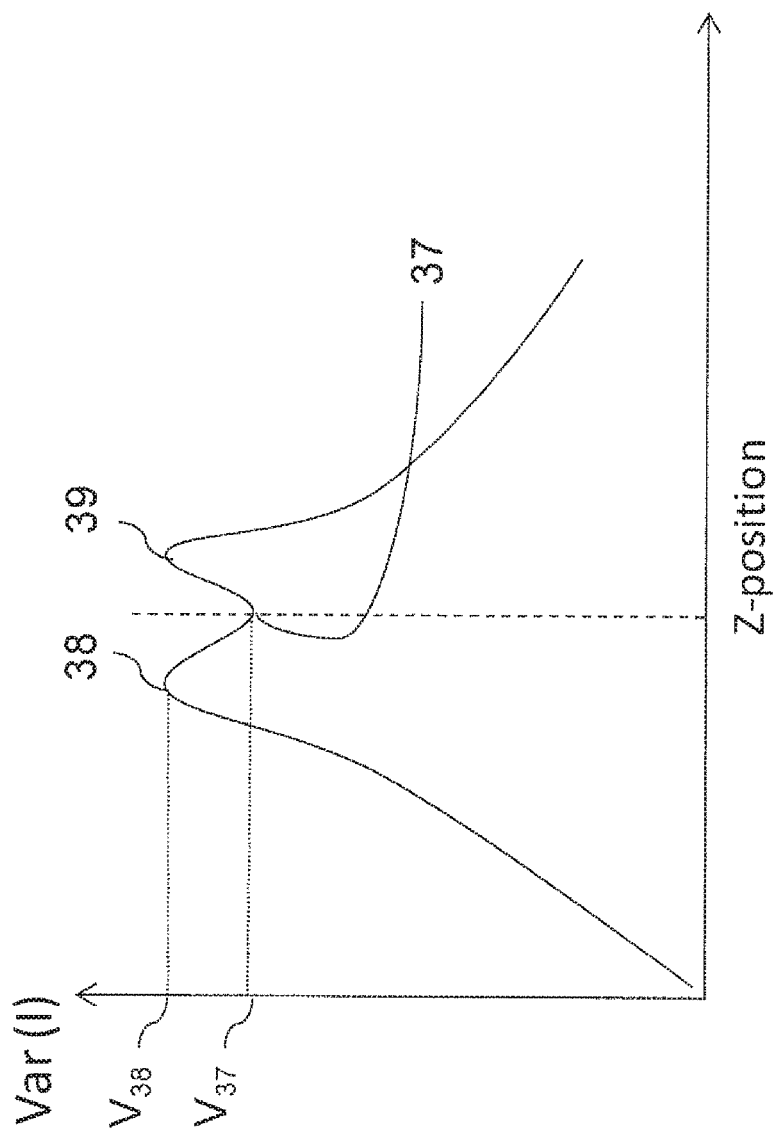

SYSTEM AND METHOD FOR CALCULATING FOCUS VARIATION FOR A DIGITAL MICROSCOPE

CROSS-REFERENCE TO RELATED APPLICATIONS

This application is a US national phase application of PCT Application No. PCT/IL/2015/050864 to Yorav-Raphael (published as WO 16/030897), filed Aug. 27, 2015, which claims the benefit of U.S. Provisional Application No. 62/042,388, filed on Aug. 27, 2014.

TECHNICAL FIELD

The presently disclosed subject matter relates to the field of microscopy and more specifically to calculating focus variation for a digital microscope.

BACKGROUND

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 4,700,298 (Palcic et al.) published on Oct. 13, 1987; U.S. Pat. No. 4,803,352 (Bierleutgeb) published on Feb. 7, 1989; U.S. Pat. No. 5,932,872 (Price), published on Aug. 3, 1999; and Vink et al. Journal of Microscopy, 2013 1-13, "An automatic vision-based malaria diagnosis system.

GENERAL DESCRIPTION

In accordance with certain aspects of the presently disclosed subject matter, there is provided a digital microscopy method, comprising: obtaining, in a memory comprised in or operatively coupled to a digital microscope, data representative of at least one image of at least a portion of a cell sample, the at least one image acquired by the digital microscope, wherein the portion encompasses a mapping field, and the mapping field comprises a plurality of focus analysis regions; and calculating, by processing resources operatively connected to the digital microscope, using the obtained data, a focus configuration for each of at least two of the focus analysis regions within the mapping field, giving rise to data indicative of focus variation within the mapping field.

In accordance with certain other aspects of the presently disclosed subject matter, there is provided a digital microscope comprising: a memory configured to obtain data representative of at least one image of at least a portion of a cell sample, wherein the portion encompasses a mapping field, and the mapping field comprises a plurality of focus analysis regions; and one or more processing resources configured to calculate, using the obtained data, a focus configuration for each of at least two of the focus analysis regions within the mapping field, giving rise to data indicative of focus variations within the mapping field.

In accordance with certain other aspects of the presently disclosed subject matter, there is provided a program storage device readable by a machine, tangibly embodying a program of instructions executable by the machine to perform method steps of: obtaining, in a memory comprised in or operatively coupled to a digital microscope, data representative of at least one image of at least a portion of a cell sample, the at least one image acquired by the digital microscope, wherein the portion encompasses a mapping field, and the mapping field comprises a plurality of focus analysis regions; and calculating, using the obtained data, a focus configuration for each of at least two of the focus analysis regions within the mapping field, giving rise to data indicative of focus variation within the mapping field.

In accordance with further aspects and, optionally, in combination with other aspects of the presently disclosed subject matter, the obtained data can be representative of a series of images, the images captured by performing a depth scan using the digital microscope, the series of images being associated with a respective series of depth levels of the cell sample.

In accordance with further aspects and, optionally, in combination with other aspects of the presently disclosed subject matter, the calculating can include operating a statistical function on the obtained data.

In accordance with further aspects and, optionally, in combination with other aspects of the presently disclosed subject matter, the calculating can include detecting at least one depth level corresponding to a drop in image contrast, wherein the detected depth level is such that image contrast at the detected depth level is lower than image contrast associated with a depth level immediately preceding the detected depth level in the series of depth levels and lower than image contrast associated with a depth level immediately following the detected depth level in the series of depth levels. The image contrast can be calculated from any of the following contrast functions: variance, standard deviation, sum of absolute-value of derivatives.

In accordance with further aspects and, optionally, in combination with other aspects of the presently disclosed subject matter, the mapping field and at least one diagnostic field within the sample can be of substantially or precisely same size and shape. At least one of the diagnostic field and the mapping field can be the largest field that can be captured by the microscope at a magnification selected for analysis of the sample.

In accordance with further aspects and, optionally, in combination with other aspects of the presently disclosed subject matter, at least one focus field can cover an area of the cell sample that is smaller than the area covered by at least one diagnostic field and the area covered by the mapping field.

In accordance with further aspects and, optionally, in combination with other aspects of the presently disclosed subject matter, at least one image of at least one diagnostic field within the cell sample can be analyzed using the data indicative of focus variation.

In accordance with further aspects and, optionally, in combination with other aspects of the presently disclosed subject matter, a confidence score can be calculated for each of the at least two focus analysis regions of the mapping field, the confidence score being indicative of an accuracy of a diagnostic analysis performed on the at least one image at a corresponding region. The at least one image of at least one diagnostic field can be acquired at a specific focus configuration, and a plurality of regions within the at least one image can be correlated with at least two of the focus analysis regions of the mapping field, and the confidence scores can be utilized for the analyzing.

In accordance with further aspects and, optionally, in combination with other aspects of the presently disclosed subject matter, the data indicative of focus variations can be utilized for defining at least one of a size or a shape of one or more diagnostic fields within the cell sample.

In accordance with further aspects and, optionally, in combination with other aspects of the presently disclosed subject matter, there is further provided: capturing at least one image of a given diagnostic field at a specific focus configuration; analyzing the at least one image to detect a pathogen candidate; correlating a plurality of regions within the at least one image with at least two of the focus analysis regions of the mapping field; and capturing at least one additional image of the pathogen candidate at an imaging focus configuration calculated using the focus configuration of at least one of the focus analysis region correlated with the position of the pathogen candidate in the diagnostic field. The capturing of at least one additional image can be performed only if the pathogen candidate is detected in a region of the diagnostic field that is correlated with a given focus analysis region of the mapping field associated with a focus configuration that differs from the specific focus configuration by at least a threshold value. The imaging focus configuration can be the focus configuration of the at least one of the focus analysis region.

In accordance with further aspects and, optionally, in combination with other aspects of the presently disclosed subject matter, there is further provided: capturing at least one image of a given diagnostic field at a specific focus configuration; correlating a plurality of regions within the at least one image with at least two of the focus analysis regions of the mapping field; and selecting a portion of the diagnostic field for analysis such that the focus variation between the specific focus configuration and the focus configuration of the focus analysis regions within the portion is below a specific value.

The present disclosure further provides a method of determining a reference depth level within a cell sample. The method comprises obtaining data representative of a series of images captured by performing a depth scan of the cell sample using a digital microscope, the series of images being associated with a series of depth levels of the cell sample; processing the data for detecting at least one depth level corresponding to a drop in image contrast; and identifying the detected depth level as the reference depth level.

In some embodiments, the detected depth level is such that image contrast at the detected depth level is lower than image contrast associated with a depth level immediately preceding the detected depth level in the series of depth levels and lower than image contrast associated with a depth level immediately following the detected depth level in the series of depth levels.

In some embodiments, the method further comprises calculating image contrast using a contrast function increasing with the image contrast and wherein detecting at least one depth level corresponding to a drop in image contrast comprises detecting a well in a contrast curve representing image contrast as a function of the depth level.

In some embodiments, the detected depth level corresponds to a bottom of the well in the contrast curve.

In some embodiments, the method further comprises calculating image contrast using a contrast function decreasing with the image contrast and wherein detecting at least one depth level corresponding to a drop in image contrast comprises detecting a roof of a contrast curve representing image contrast as a function of the depth level.

In some embodiments, the detected depth level corresponds to a top of the roof of the contrast curve.

In some embodiments, a span of the series of depth levels is of 5 to 1000 micrometers.

In some embodiments, a span of the series of depth levels is less than 50 micrometers.

In some embodiments, focusing the microscope at an investigation level further comprises shifting a focus plane of the digital microscope from the reference depth level by a specific value.

In some embodiments, the image contrast of an image is calculated from any of the following contrast functions: variance, standard deviation, sum of absolute-value of derivatives.

Further, it is understood that the term "well" is used to refer to a point or region of a curve where the curve passes from decreasing (curving down) to increasing (curving up). It is understood that the term well refers to a drop of contrast. In the following, it is generally considered that contrast function is such that a drop of contrast between two images generates a drop in the contrast function values (i.e. the contrast function is an increasing function of the image contrast). However, it is noted that if the contrast function is a function decreasing with the contrast, a drop of contrast would generate an increase in the contrast function thereby turning a "well" into a "roof". It will be appreciated that a decreasing function can be transformed into an increasing function of the contrast by multiplying the function by −1. Therefore, the present disclosure also applies to decreasing function of the contrast. It will also be appreciated that another way of applying the teaching of the present invention to a decreasing function of the contrast would be to determine a "roof" instead of a well for a decreasing contrast function of the contrast (i.e. contrast functions so that a drop of contrast generates an increase in the contrast function values), wherein the roof refers to a point or region of the curve where the curve passes from increasing (curving up) to decreasing (curving down). However, since in the art most contrast functions are increasing with the contrast, the present disclosure refers generally, without any limitation, to a well.

Furthermore, it is noted that the term "bottom" of the well should be understood as the minimum point within a well and that the term "top of a roof" should be understood as a maximum point within a roof. It is also understood that the term "series" refers to an ordered set of values. In particular, the series of depth levels may be arranged in increasing or decreasing order.

It is also appreciated that the present disclosure also applies to functions which are usually classified in the art as representative of sharpness and that the expression "contrast function" should be understood as referring generally to contrast and/or sharpness function i.e. functions for assessing a contrast and/or sharpness of an image.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 6 is an illustration of a mapping field including a quality confidence score, in accordance with some embodiments of the presently disclosed subject matter;

FIG. 8 illustrates an image variance calculation, in accordance with some embodiments of the presently disclosed subject matter;

FIG. 9 illustrates an example for a focus curve obtained by depth scanning of a cell sample and computing of a focus function according to some embodiments of the present disclosure;

FIG. 11 illustrates a non-limiting example of a mapping field having a plurality of focus analysis regions;

DETAILED DESCRIPTION

Figure 1A:
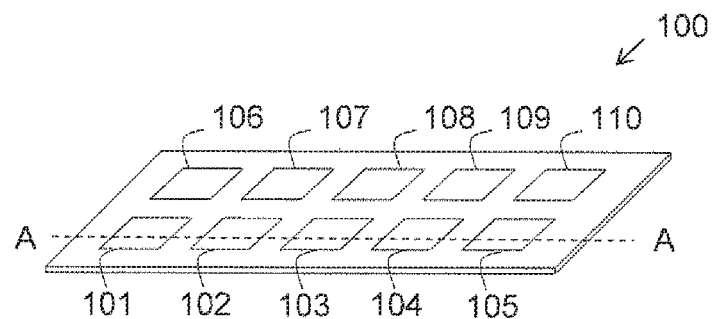
FIG. 1A is a top view illustration of a sample carrier that may be used in connection with some embodiments of the presently disclosed subject matter.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

In many cases, a biological cell sample being analyzed through a microscope is larger than the optical field of the microscope at the desired magnification. Therefore, in some cases, a plurality of images are acquired, each having a different position along an XY plane parallel to the focal plane of the microscope. Each of these images presents a so called "diagnostic field" within the biological sample. The images or parts thereof can be analyzed in order to detect the presence of a pathogen suspected to be included in the cell sample and/or for characterizing the composition of a cell sample (for example in a complete blood cell count).

In order for a captured image to be clear, the microscope needs to be focused on the cell sample. The focusing can be performed by overlaying a focal plane of the microscope with an investigation plane of the sample being imaged. For example, one may focus the microscope by changing a distance between the sample carrier holding the biological cell sample and the microscope's lens and/or by adjusting properties of the lens or any other way known in the art.

As used herein, a focus configuration means a configuration of the microscope characterized by the relative positions of the microscope focal plane and an investigation plane in the cell sample. Optionally, the focus configuration can be defined by the distance between these relative positions. Optionally, the focus configuration for any given focus analysis region can be a value related to a distance between the investigative plane of the given focus analysis region and the investigative plane of another focus analysis region, such as a prior analyzed focus analysis region. A focus configuration of a microscope may be manipulated for example by changing one or more of (a) a distance between the microscope objective lens and the cell sample; and (b) one or more properties of the microscope lens. It is to be noted that the focus configuration can be manipulated in other ways, including ways that are known in the art, to control the position of a microscope's focal plane relative to a cell sample investigation plane.

A focus configuration may be selected by analyzing data representative of a series of overlapping images of a cell sample or a portion thereof, captured by performing a depth scan using a digital microscope, the series of images being associated with a series of depth levels of the cell sample. Analyzing may include by applying a focus function to the data to select a focus configuration, as further detailed herein. The selected focus configuration may be indicative of an imaging focus configuration, namely a focus configuration at which to capture at least one image of the sample for analysis.

Selecting an imaging focus configuration may be considered as focusing. Selecting an imaging focus configuration may include selecting a reference focus configuration and calculating an imaging focus configuration therefrom (e.g. by adding or subtracting a fixed value or a percentage), as further detailed herein.

Due to various reasons such as tolerance in the microscope setup and fabrication and/or curvature of some sample carriers, the investigation plane in the sample carrier is not necessarily perfectly parallel to the microscope's focal plane. In addition, the focal plane is not necessarily perfectly flat at a given magnification. Accordingly, the focus configuration applicable for one location (e.g. a Cartesian (X,Y) position) in a sample may differ from the focus configuration applicable for another location in the same sample.

Figure 1B:
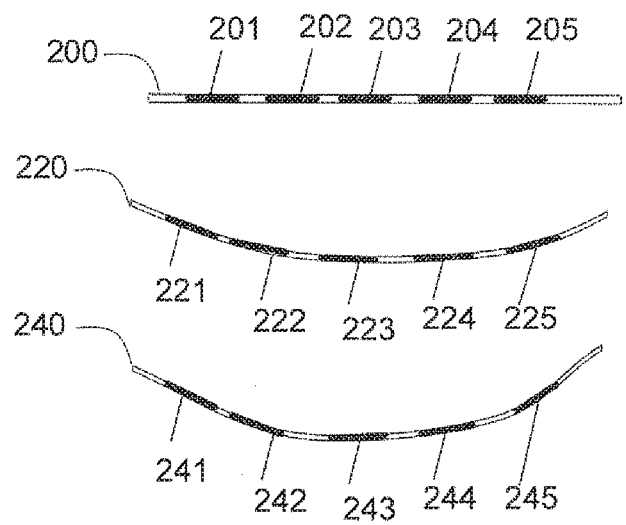
FIG. 1B is an illustration of some cross section lateral views of sample carriers as having a top view as shown in FIG. 1A.

FIG. 1A shows a top view illustration of a sample carrier, that may be used in connection with some embodiments of the presently disclosed subject matter, and FIG. 1B shows an illustration of some cross section lateral views of sample carriers having a top view as shown in FIG. 1A. The lateral cross sections may be for example taken along a line A-A as shown in FIG. 1A.

Sample carrier 100 can comprise one or more chambers, each configured to accommodate a cell sample. In the illustrated example ten chambers are depicted, namely chambers 101-110, however this is merely a non-limiting example and any other number and configuration of chambers is also contemplated.

As used herein, a "sample carrier" can be any carrier known in the art for holding a biological cell sample. Examples include carrier slides, laboratory receptacles, dishes, plates, multi-well plates, test tubes (e.g. with a flat bottom), microfluidic cells and cartridges and the like, provided that it has at least one transparent side allowing imaging.

It can be appreciated that in the illustrated examples, in the cross section view of sample carrier 200 the chambers 201-205 are all flat, which enable positioning thereof parallel to a surface on which the sample carrier 200 is to be placed and/or parallel to the microscope's focal plane. However, looking at sample carriers 220 and 240, it can be appreciated that they are bent. Accordingly, the chambers in the bent sample carriers 220 and 240 (chambers 221-225 and 241-245 respectively) have different angles (i.e. they are not parallel) with respect to a surface holding the sample holder 220 or 240 and/or with respect to the microscope's focal plane. While chamber 243 may be essentially parallel to such surface and/or to such focal plane, chamber 244 would have an angle with respect to the surface and/or to the focal plane and chamber 245 would have an even sharper angle with respect to the surface and/or to the focal plane. It is to be noted that the bends in the illustration are drawn very prominently for illustrative purposes. In reality, the angles of all or part of the chambers with respect to the surface holding the corresponding sample carrier and/or with respect to the microscope's focal plane, can sometimes be difficult or even impossible to detect by the naked eye but might still have a significant effect on focus under microscope magnification. It is to be further noted that although the bends shown in the illustration are on the longitudinal axis, this is of course not limiting, and the bends can additionally or alternatively be on the latitudinal axis. Moreover, the internal bottom surface of the carrier may have a different contour than that of the external bottom surface, such that even if the carrier is positioned in parallel to the surface holding the corresponding sample carrier and/or with respect to the microscope's focal plane, the cell sample within it may lie on a relatively bent surface, thereby having a bent investigation plane.

In some cases, irrespective of any bending of the sample carrier, tolerance in the microscope's setup and/or fabrication can also result in (or contribute to) the investigation place in the sample carrier not being parallel to the microscope's focal plane. In addition, the microscope's focal plane itself might not be flat at a given magnification. Any one or any combination of two or more of the scenarios illustrated above, and/or any other reason that results in the investigation plane in the sample carrier not being parallel to the microscope's focal plane, optionally results in a difference between a focus configuration applicable for one location (e.g. a Cartesian (X,Y) position) in a cell sample and a focus configuration applicable for another location in the same cell sample or the same chamber or the same portion of a chamber or for a plurality of chambers, as further detailed herein.

Figure 2A:
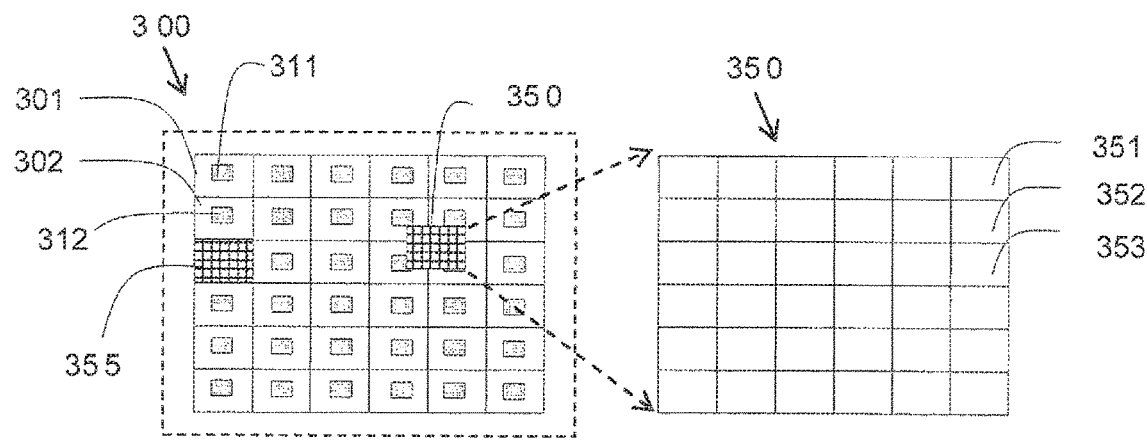
FIG. 2A is a top view illustration of a sample chamber comprising diagnostic fields, focus fields and mapping fields, in accordance with some embodiments of the presently disclosed subject matter.

Attention is now drawn to FIG. 2A, showing a top view illustration of a sample chamber comprising diagnostic fields, focus fields and mapping fields, in accordance with some embodiments of the presently disclosed subject matter. Optionally, a given image covers precisely a given diagnostic field, focus field or mapping field. In some embodiments, a given diagnostic field, focus fields or mapping field is defined as one or more portions of a specific image. Optionally, several images or portions thereof are assembled to define a diagnostic field, focus field or mapping field.

Sample chamber 300 comprises a plurality of diagnostic fields (e.g. diagnostic fields 301, 302, etc.). A diagnostic field is an area covering a portion of the sample chamber 300 that comprises a cell sample to be imaged, and is imaged as a single image under at least one lighting configuration of the microscope, to be analyzed for various purposes, including diagnostics, detection of pathogens, blood count, and the like. Optionally, a plurality of images of a single diagnostic field are taken for analysis, each image encompassing the entire diagnostic field. It is to be noted that although the sample chamber 300 shown in the illustration comprises a plurality of diagnostic fields (namely thirty six (36) diagnostic fields), in some cases the sample chamber can comprise a single diagnostic field, or any other number of diagnostic fields, in any configuration. Likewise, while the sample chamber, the diagnostic fields, the focus fields and the mapping fields in FIG. 2A are depicted as rectangular shapes, any other shapes may be used, covering the entire surface of the chamber or only one or more portions thereof.

For each diagnostic field, a corresponding focus field is shown in the example, as a gray rectangle (e.g. focus fields 311, 312 in diagnostic fields 301, 302, respectively). A focus field is an area covering a portion of the sample chamber 300 used for calculating a focus configuration to be used for acquiring images of at least one diagnostic field, as further detailed herein. It is to be noted that although the focus fields (e.g. focus fields 311, 312) are shown as a portion of the diagnostic fields, in some cases the focus field can be identical to the diagnostic field. In addition, although the focus fields (e.g. focus fields 311, 312) are shown as fully overlapping the diagnostic field, in some cases the focus field can overlap the diagnostic field only partially, and in other cases it is possible that no such overlap will exist. Still further, although in the illustrated example each diagnostic field has a corresponding focus field therein (focus field 311 for diagnostic field 301, focus field 312 for diagnostic field 302), in some cases fewer or more focus fields can exist. Moreover, a single focus field can overlap, or partially overlap, more than one diagnostic field. In addition, as indicated herein, a given focus field can be used to calculate a focus configuration to be used for acquiring images of more than one diagnostic field, including for one or more diagnostic fields that do not overlap the given focus field at all.

Also shown in the illustration are examples for mapping fields 350 and 355. A mapping field is an area covering a portion of the sample chamber 300 used for obtaining data indicative of focus variation within at least a portion of the sample holder (e.g. within the portion covered by the mapping field), as further detailed herein. Such data can further be used for extrapolating additional data indicative of focus variations in portions external to the mapping field, as further detailed herein.

In the illustration, mapping field 355 is shown as identical or essentially identical to the diagnostic field shown immediately below diagnostic field 302, whereas mapping field 350 is shown to partially overlap four (4) diagnostic fields. It is to be noted however that the mapping fields are not necessarily of the same shape and/or size of the diagnostic field and that they do not necessarily overlap any given diagnostic field. However, in some cases they can be of the same shape and/or size as of the diagnostic field, or substantially of the same shape and/or size of the diagnostic field. Optionally, at least one diagnostic field is used also as a mapping field. It is to be noted that in some cases, at least one diagnostic field and at least one mapping field are the largest fields (i.e. imaged areas) acquired by the microscope at a magnification selected for analysis of the cell sample.

Each mapping field comprises a plurality of focus analysis regions. For illustration purposes, looking at the right hand side of the FIG. 2A, there is shown an enlarged view of mapping field 350, comprising a plurality of focus analysis regions (e.g. focus analysis region 351, 352, 353, etc.). A focus analysis region is an area covering a portion of the mapping field for which a corresponding focus configuration is calculated, as further detailed herein.

It is to be noted that in some cases at least one focus field covers an area of the cell sample that is smaller than the area covered by at least one diagnostic field and at least one mapping field.

Figure 2B:
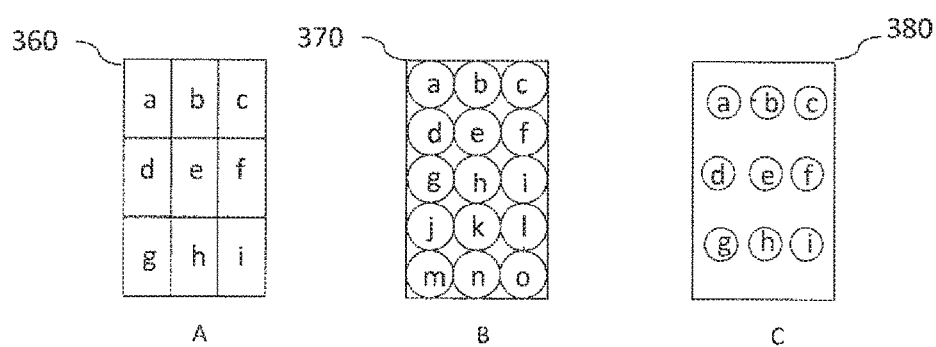
FIG. 2B is an illustration of some alternative shapes and distributions of focus analysis regions within a mapping field, in accordance with some embodiments of the presently disclosed subject matter.

FIG. 2B shows an illustration of some alternative shapes and distributions of focus analysis regions within a mapping field, in accordance with some embodiments of the presently disclosed subject matter. In the illustration, mapping fields 360, 370 and 380 are depicted as rectangles. Mapping field 360 is split to a three by three (3×3) grid or matrix of rectangle shaped focus analysis regions a-i. However, the focus analysis regions may have any shape, and any number of focus analysis regions may be included in any mapping field. In some cases a mapping field can comprise a single focus analysis region, and in some cases (not limiting) such single focus analysis region can overlap the mapping field. While the focus analysis regions need not cover the entire mapping field (as shown, for example, in mapping fields 370 and 380) they may do so (as shown for example in mapping field 360). Optionally, some or all of the focus analysis regions may partially overlap one or more other focus analysis regions. It is to be noted that in some cases there is a direct relation between the number and/or size of focus analysis regions and the accuracy of the data indicative of focus variations. However, there may also be a direct relation between the number of focus analysis regions and the background noise, and the time needed for analysis of focus variation of a mapping field may increase in proportion to the number of focus analysis regions. In some non-limiting cases, the number of focus analysis ranges within a given mapping field may range between 2 to 1000 focus analysis regions. In more specific cases, the number of focus analysis ranges within a given mapping field may range between 9 to 120 focus analysis regions.

Figure 3A:
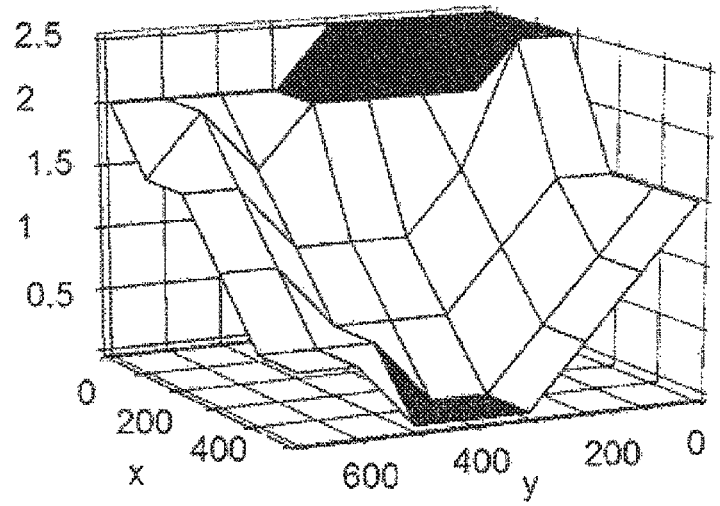
FIG. 3A is an illustration of a three-dimensional view of raw data indicative of focus configurations calculated for focus analysis regions of a mapping field, in accordance with some embodiments of the presently disclosed subject matter.

FIG. 3A is an illustration of a three-dimensional view of raw data indicative of focus configurations calculated for focus analysis regions of a mapping field, in accordance with some embodiments of the presently disclosed subject matter.

In this example, data representative of a series of images of a mapping field spanning 500 µm by 700 µm of the surface of a sample carrier was analyzed. The data represented images that were captured by performing a depth scan (as detailed inter alia with respect to FIG. 5) of the mapping field using a digital microscope. In the illustration, the mapping field was divided into 35 identical rectangular focus analysis regions.

In the illustration, the XY plane is a plane parallel to the focal plane of the microscope. In an ideal case, an unbent diagnostic field should have a focus variation map that is perfectly parallel to the XY plane. In the example, the focus configuration is depicted as a function of the distance between the microscope objective and the investigation plane in the sample. The focus configuration at the field having the most extreme focus configuration was set at 0 and all other fields are shown relative thereto. In this example, focus configurations calculated for the focus analysis regions in the shown mapping field varied along the z axis by up to 2.5 µm.

It is to be noted that the three dimensional view is provided for illustrative purposes only and it is based on the actual raw data that is the focus configuration calculated for each corresponding focus analysis region. It is to be noted that the focus configuration can be actually represented by a single calculated number, e.g. a number indicative of a relative position of the microscope focal plane and an investigation plane in the cell sample.

Figure 3B:
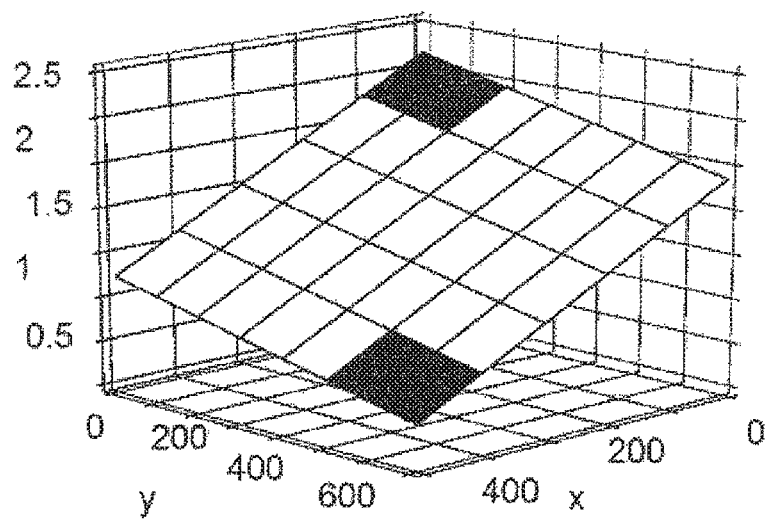
FIG. 3B is an illustration of three-dimensional view of a flat plane matched to the raw data shown in FIG. 3A, in accordance with some embodiments of the presently disclosed subject matter.

When looking at a single mapping field within a sample chamber, it is expected that it will be essentially flat and linear, but possibly at an angle with respect to the focal plane of the microscope. It can be appreciated that in the illustrated example, there is a clearly a deviation from this expectation. Such deviation can be explained mainly by optical distortion (a property of the lens) and some background noise. Therefore, in some cases, a flat plane can be matched to the raw data. This may be performed for example using least squares regression, which finds the equation of a plane $z=ax+by+c$ that minimizes the sum of the square of vertical distance between the plane and the raw data. FIG. 3B shows an illustration of a three-dimensional view of a flat plane matched to the raw data shown in FIG. 3A, in accordance with some embodiments of the presently disclosed subject matter.

By matching a plane to the raw data, the noise may be reduced, but some information regarding optic distortion can be lost. In some cases, e.g. where focus finding is performed using brightfield images whereas florescent images are used for diagnosis (alone or together with brightfield images), the optic distortion of brightfield may be ignored.

Figure 4:
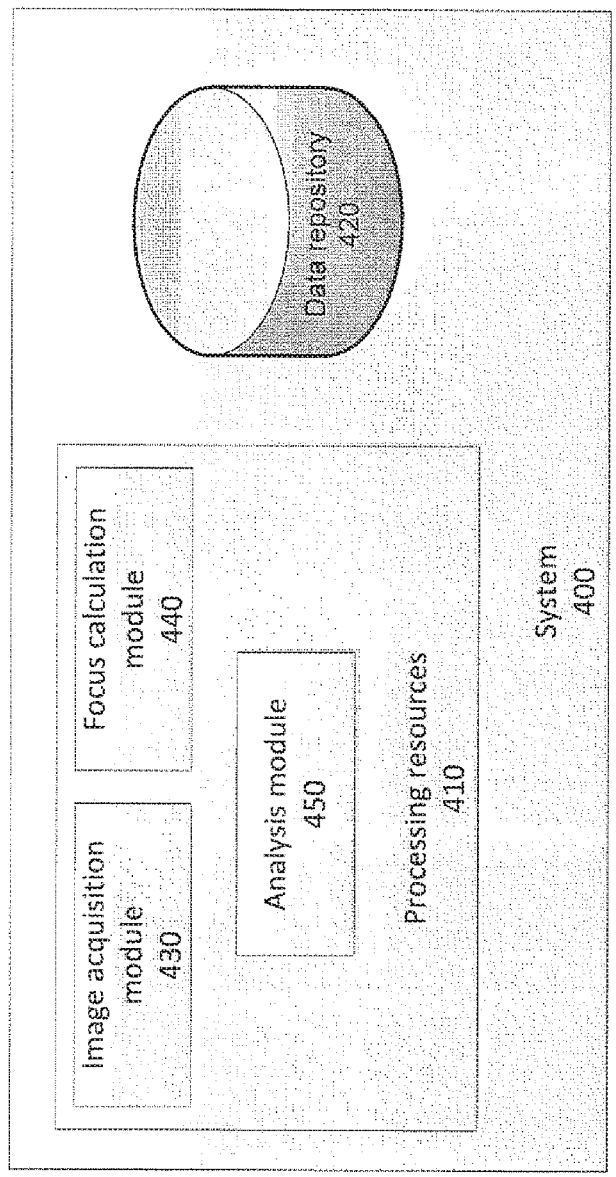
FIG. 4 is a block diagram schematically illustrating one example of a system for calculating focus configurations for a digital microscope, in accordance with some embodiments of the presently disclosed subject matter.

FIG. 4 is a block diagram schematically illustrating one example of a system for calculating focus configurations for a digital microscope, in accordance with some embodiments of the presently disclosed subject matter.

According to some examples of the presently disclosed subject matter, all or parts of the system 400 can be comprised within a digital microscope, or be otherwise operatively connected to a digital microscope.

System 400 can comprise one or more processing resources 410. The one or more processing resources 410 can be a processing unit, a microprocessor, a microcontroller or any other computing device or module, including multiple and/or parallel and/or distributed processing units, which are adapted to independently or cooperatively process data for controlling relevant system 400 resources and for enabling operations related to system 400 resources.

According to some examples of the presently disclosed subject matter, system 400 can comprise (or be otherwise associated with) a data repository 420, configured to store data, including inter alia, data relating to focus configurations, images acquired by the microscope, etc. Data repository 420 can be any volatile and/or non-volatile memory, including, for example, magnetic media such as a hard disk drive (HDD), Solid-State Drives (SSD), FLASH memory or FLASH drives, Electrically Erasable Programmable Read-Only Memory (EEPROM), battery backed DRAM or SRAM, Random-access memory (RAM), etc.

According to some examples of the presently disclosed subject matter, the processing resources 410 can include (or be otherwise associated with) one or more of the following modules: image acquisition module 430, focus calculation module 440 and analysis module 450.

In some cases image acquisition module 430 can be configured to control the digital microscope for acquiring images of the cell sample and/or parts thereof, as further detailed herein.

In some cases focus calculation module 440 can be configured to calculate focus configurations to be used for acquiring images of the cell sample or parts thereof by the digital microscope, as further detailed herein.

In some cases analysis module 450 can be configured to analyze the images acquired by the digital microscope, as further detailed herein.

Figure 5:
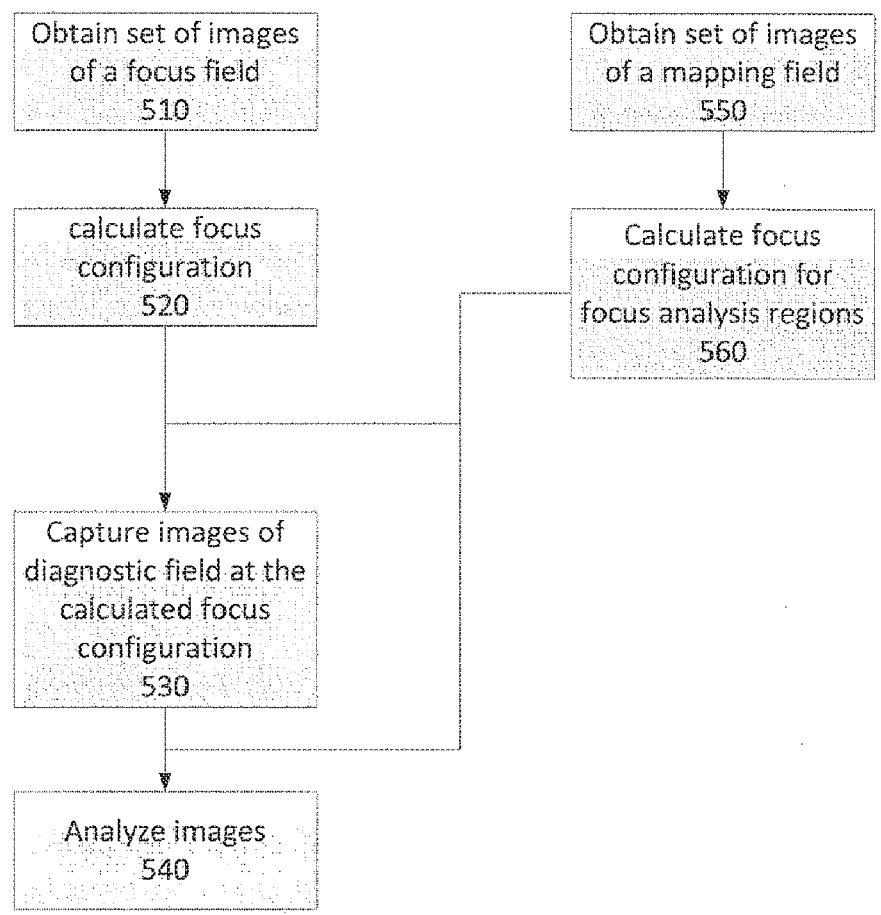
FIG. 5 is a flowchart illustrating one example of a sequence of operations carried out for imaging and analyzing a biological cell sample, in accordance with some embodiments of the presently disclosed subject matter.

Attention is drawn to FIG. 5, showing a flowchart illustrating one example of a sequence of operations carried out for imaging and analyzing a biological cell sample, in accordance with some embodiments of the presently disclosed subject matter.

According to some examples of the presently disclosed subject matter, system 400 can be configured to obtain data representative of a series of images (also referred to as a set of images) of a focus field within a sample chamber of a sample holder placed on a digital microscope stage, the images captured by focusing the digital microscope at a corresponding series of depths levels along the optical axis (e.g. the Z axis) of the microscope (block 510). As indicated herein, a focus field is an area covering a portion of the sample chamber 300 used for calculating a focus configuration to be used for acquiring images of at least one diagnostic field. The process of capturing the images by focusing a digital microscope at a corresponding series of depths levels along the optical axis of the microscope is also referred to as in-depth scanning.

The in-depth scanning can be performed, for example, by varying a distance between a focus plane of the microscope and a sample holder intended to accommodate a cell sample by methods well known in the art. In some cases, obtaining the set of images can be carried out using an image sensor unit of the microscope connected with the processing resources 410 of the system 400. In some cases, in-depth scanning may be performed with brightfield illumination.

It is to be noted that the term "obtain data representative of a series of images" encompasses one or both of actual capturing of images by imaging of a portion of a cell sample to acquire the set of images (in-depth scanning) and respective data (e.g. utilizing the image acquisition module 430), and also loading/downloading from a computer storage media (e.g. data repository 420) a set of images of the field preliminarily acquired by a digital microscope and/or the data relating to the set. In some cases the portion of the cell sample which is imaged is a field within the sample (e.g. a focus field, mapping field, diagnostic field, etc.). Optionally, the imaged field can be captured in whole or in parts. Optionally, one or more images covering one focus analysis region within a mapping field may be captured separately from one or more images covering another focus analysis region within the same mapping field, for example by performing a plurality of depth scans, each for a different portion of the sample.

Further, the term depth level may be understood as a coordinate value along the optical axis of the microscope corresponding to a position that is optionally inside the cell sample or the sample holder/chamber. The actual direction of the axis and the origin of the axis to quantify depth may be arbitrarily chosen. The images may be obtained in any order, and may have an equal distance along the axis between pairs of consequent images or at a varying distance i.e. the in-depth scanning may be performed with a fixed step or with a variable step. For example, the origin of the axis may be positioned at an outer surface of the cell sample facing an objective of the microscope and the direction of the coordinate axis may be chosen so that the coordinates increase when progressing toward the cell sample. It is also understood that since the series of depth levels may be understood as an ordered set along the axis, it is possible to define endpoint depth levels (hereinafter referred to as endpoints) of the series of depth levels. As used herein, the term scanning depth interval refers to a series of depth levels between two endpoints' depth levels. One endpoint level of a series of depth levels, for example a minimum depth level of the set, may be referred to as a first scanning depth level and the other endpoint of the set, for example the maximum depth level, may be referred to as a second scanning depth level. In such case, the scanning depth interval refers to the depth levels comprised between the first and second scanning depth levels.

In some cases, an estimated reference depth level may be preliminarily provided. For example, the cell sample may comprise a plurality of diagnostic fields to be investigated and reference depth levels determined for one or more previous diagnostic fields may be used to estimate the estimated reference level for a subsequent diagnostic field. In these cases, the scanning depth interval may be selected so as to cover the estimated depth reference level i.e. distances between the estimated depth reference level and the first and second scanning depth levels may be above a specific threshold. In some cases, a span of the depth scanning interval may be of around 5 micrometers to 1000 micrometers. In some cases, the span of the depth scanning interval may be between 150 and 250 micrometers, or less than 50 micrometers or even between 10 and 30 micrometers. Optionally, the estimated depth level is approximately in the midpoint of the span of the depth scanning interval.

In some cases, the series of images and associated depth levels (or the data representative thereof) are utilized for calculating a focus configuration to be used for imaging one or more diagnostic fields (block 520). The focus configuration can be calculated by operating any desired focus function on the series of images and their respective associated depth levels, e.g. utilizing the focus calculation module 440. Several non-limiting examples of such focus functions are disclosed in: Groen, Frans C A, Ian T. Young, and Guido Ligthart. "A comparison of different focus functions for use in autofocus algorithms." *Cytometry* 6.2 (1985): 81-91. An additional example is provided herein, with reference to FIGS. 7-9 and to US Provisional Application No. U.S. 61/826,718, filed May 23, 2013, which is incorporated herein by reference. In some cases, the focus function can be a statistical function.

It is to be noted that in some cases, the smaller the focus field is, the faster a focus configuration can be calculated thereto. Therefore, in some cases the focus field can be smaller than the diagnostic fields. On the other hand, the smaller the focus field is, the accuracy of the calculated focus configuration may be reduced (which can have a negative effect on the accuracy of the diagnostic field analysis). It is to be noted that in some non-limiting cases the size of the focus field can range between 1 to 50 percent of the size of the diagnostic field. In more specific cases, the size of the focus field can range between 1 to 25 percent of the size of the diagnostic field. In even more specific cases, the size of the focus field can range between 1 to 10 percent of the size of the diagnostic field. In even more specific cases, the size of the focus field can range between 1 to 5 percent of the size of the diagnostic field. In even more specific cases, the size of the focus field can range between 1 to 3 percent of the size of the diagnostic field.

In some cases, the focus field can at least partially overlap one or more diagnostic fields that are to be acquired using the configuration calculated using the focus field. It is to be noted that using a focus configuration that is calculated using a focus field that at least partially overlaps a given diagnostic field in order to image the given diagnostic field, can yield better analysis accuracy compared to using a focus configuration that is calculated using a focus field that does not overlap the given diagnostic field.

In some cases, a focus configuration is calculated to one or more diagnostic fields using a focus field that is comprised within a corresponding diagnostic field. It is to be noted that in some cases, the focus field can be identical to one of the diagnostic fields (i.e. have the same size and shape and cover the same area of the cell sample).

According to some examples of the presently disclosed subject matter, system 400 can be configured to capture at least one image, of one or more diagnostic fields, at the focus configuration calculated for the corresponding focus fields or at an imaging focus configuration that is calculated therefrom (e.g. by adding or subtracting a fixed value or a percentage from the focus configuration calculated for the corresponding focus fields) (block 530), e.g. utilizing the image acquisition module 430. Optionally, system 400 can be further configured to analyze the images of the diagnostic fields (block 540), e.g. utilizing the analysis module 450.

At any time before image analysis is performed, data indicative of focus variations within one or more mapping fields can be obtained. For this purpose, system 400 (e.g. utilizing the image acquisition module 430) can be configured to obtain data representative of a series of images (also referred to as a set of images) of at least a portion of a cell sample, the portion encompassing one or more mapping fields within a sample chamber of a sample holder placed on a digital microscope stage (block 550). The images are captured by focusing the digital microscope at a corresponding series of depths levels along the optical axis (e.g. the Z axis) of the microscope. It is to be noted that the process of obtaining the data representative of a series of images is similar to the process described above with respect to block 510, with the exception of the imaged portion described with respect to block 510 being a focus field whereas the imaged portion described with respect to block 550 being a mapping field. Optionally, the mapping field is not imaged as a whole but rather different portions thereof are imaged separately, each at a plurality of different depth levels (for example one or more focus analysis regions may be imaged separately from one or more other focus analysis regions). This may provide the depth scan spanning a mapping field, even if one scan comprises images taken at different depth levels than another scan. For example, a plurality of depth scans may be performed for different sub-portions of the sample within a single mapping field, for example, each depth scan may relate to one or more focus analysis regions. As indicated herein, a mapping field is an area covering a portion of the sample chamber 300 used for obtaining data indicative of focus variations within at least a portion of the sample chamber (e.g. within the portion covered by the mapping field). For this purpose, each mapping field comprises a plurality of focus analysis regions. As indicated herein, a focus analysis region is an area covering a portion of the mapping field for which a corresponding focus configuration is calculated.

In some cases, the series of images and associated depth levels (or the data representative thereof) are utilized for calculating a focus configuration for at least two focus analysis regions within the mapping fields, giving rise to data indicative of focus variations within the mapping fields (block 560). It is to be noted that any distribution of the focus analysis regions within the mapping fields as disclosed with respect to FIG. 2B is contemplated. The focus configuration can be calculated by operating any desired focus function on the series of images and their respective associated depth levels, e.g. utilizing the focus calculation module 440. The non-limiting examples provided with respect to block 520 are applicable also for this purpose.

In some cases, a single image of a mapping field, or a portion thereof encompassing at least two focus analysis regions, can be used to calculate the focus configuration. For example, the system can obtain data representative of an image of a portion of the cell sample comprising a mapping field having a plurality of focus analysis regions, and can compare the appearance of objects depicted in at least two focus analysis regions in the mapping field. Certain variations in the appearance of objects of a given type in different focus analysis regions can sometimes be attributed to differences in the respective objects' positions along the z-axis relative to the focal plane of the microscope. For example, cells (e.g. red blood cells) depicted in the image which lie at different heights relative to the focal plane of microscope can exhibit variances in appearance such as width, sharpness of contour lines, color, intensity, etc. These variations in appearance can be analyzed and used to calculate focus configurations for the different focus analysis regions of the mapping field, thereby giving rise to data indicative of focus variation within the mapping field, as will be detailed below with reference to FIG. 11. As used herein, "obtain data representative of an image" encompasses one or both of actual capturing of the image by imaging of a portion of a cell sample to acquire the image and respective data (e.g. utilizing the image acquisition module 430), and also loading/downloading the image from a computer storage media (e.g. data repository 420), such as an image preliminarily acquired by a digital microscope, and/or the data relating thereto.

By way of non-limiting example, the system can use variations in intensity or in intensity related data between images spanning at different focus analysis regions to calculate, estimate or otherwise obtain information relating to a focus configuration by:

1. Obtaining a correlation function which provides known intensity related data, e.g. intensity statistics (e.g. variance) at each of several focus configurations. A correlation function can be obtained in any manner known in the art (e.g. in the form of a graph similar to FIG. 9 or a mathematical equation representing the same correlation). Optionally, the correlation function can be obtained in advance and stored in a memory, e.g. data repository 420. Optionally, the correlation function can be generated on the fly by capturing or otherwise obtaining a series of depth scanned images of at least a portion of the mapping field, and calculating an intensity statistic for each image in the series of depth scanned images, essentially as detailed below with reference to FIG. 8. Since certain intensity statistics (e.g. variance) may be affected by the number of cells appearing therein, the obtained correlation function is optionally normalized or otherwise corrected to a number or concentration of cells (for example the number of red blood cells). Optionally, the intensity statistic for each focus analysis region may be adjusted according to number or concentration of cells in that region and according to the cell count or concentration of cells in images based upon which the correlation function was produced. Additionally, certain intensity statistics (e.g. variance) may be affected by the surface area of the sample carrier captured in an image being analyzed. Thus, the obtained correlation function is optionally normalized or otherwise corrected to the surface area. Optionally, the intensity statistic for each focus analysis region may be adjusted according the surface area spanned by the region and according to the surface area of the sample carrier covered in images based upon which the correlation function was produced.

2. Calculating, for each of the two or more focus analysis regions, intensity related data with respect to a reference intensity related data, e.g. as detailed below with reference to FIG. 8. Optionally, this calculation provides a relative value between the different focus analysis regions, without providing an absolute value for some or any of the focus analysis regions; and 3. Estimating, for each of the two or more focus analysis regions, a focus configuration based on the correlation function and the calculated intensity related data of each respective focus analysis region, as detailed below with reference to FIG. 8. These values may be absolute (e.g. with respect to a given position and/or configuration of the imaging module and/or the sample carrier) and/or may be relative values relating to a degree of variation between the different focus analysis regions.

Figure 12:
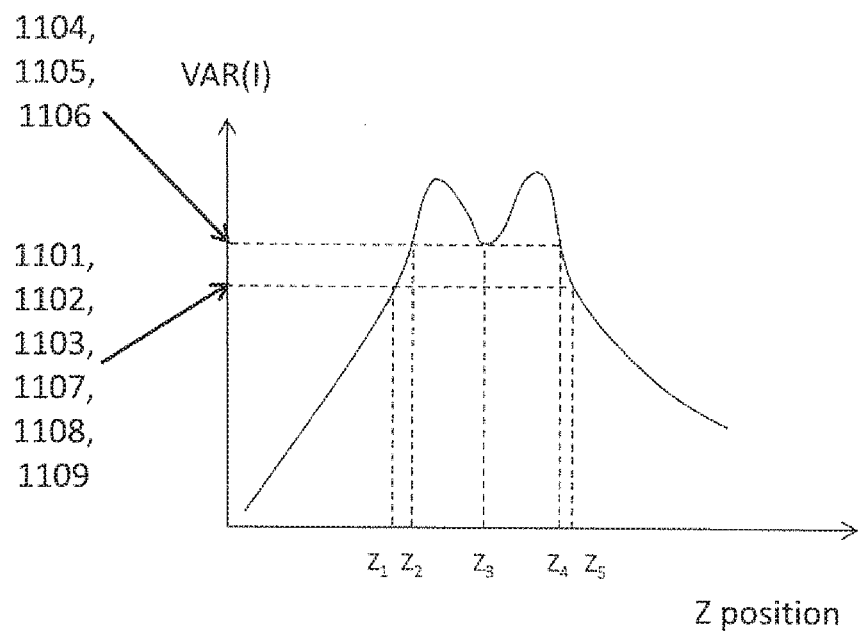
FIG. 12 illustrates a non-limiting example of a correlation function.

FIG. 11 illustrates a non-limiting example of a mapping field 1100 having focus analysis regions 1101-1109. FIG. 12 illustrates a non-limiting example of a correlation function, in which each of focus analysis regions 1101-1109 is mapped to a scanning depth level $Z_n$ indicative of a focus configuration.

In some embodiments (such as in the example of FIG. 12 where the correlation function provides a "well" correlation function), if the correlation function has a plurality of focus configurations that correspond to one calculated value, one or more of the following may apply:

(a) The direction of the variation may be immaterial, and for example two symmetric results may be treated the same way. This is especially true when the variation value is high enough to reject the sample carrier, but also when the degree of variation (angle of the carrier internal bottom surface) is of more interest than a direction thereof; or (b) data from the image may be used in order to define a direction of the variation (e.g. $Z_1$ v. $Z_5$) and/or select between a plurality of values having the same direction (not shown in the example). By way of non-limiting example, since the slide is continuous, a degree of variation may be estimated in correlation to a distance from a defined point. In such cases, the shape of the curve may be followed (and/or extrapolated and/or interpolated) through a plurality of fields.

Figure 13:
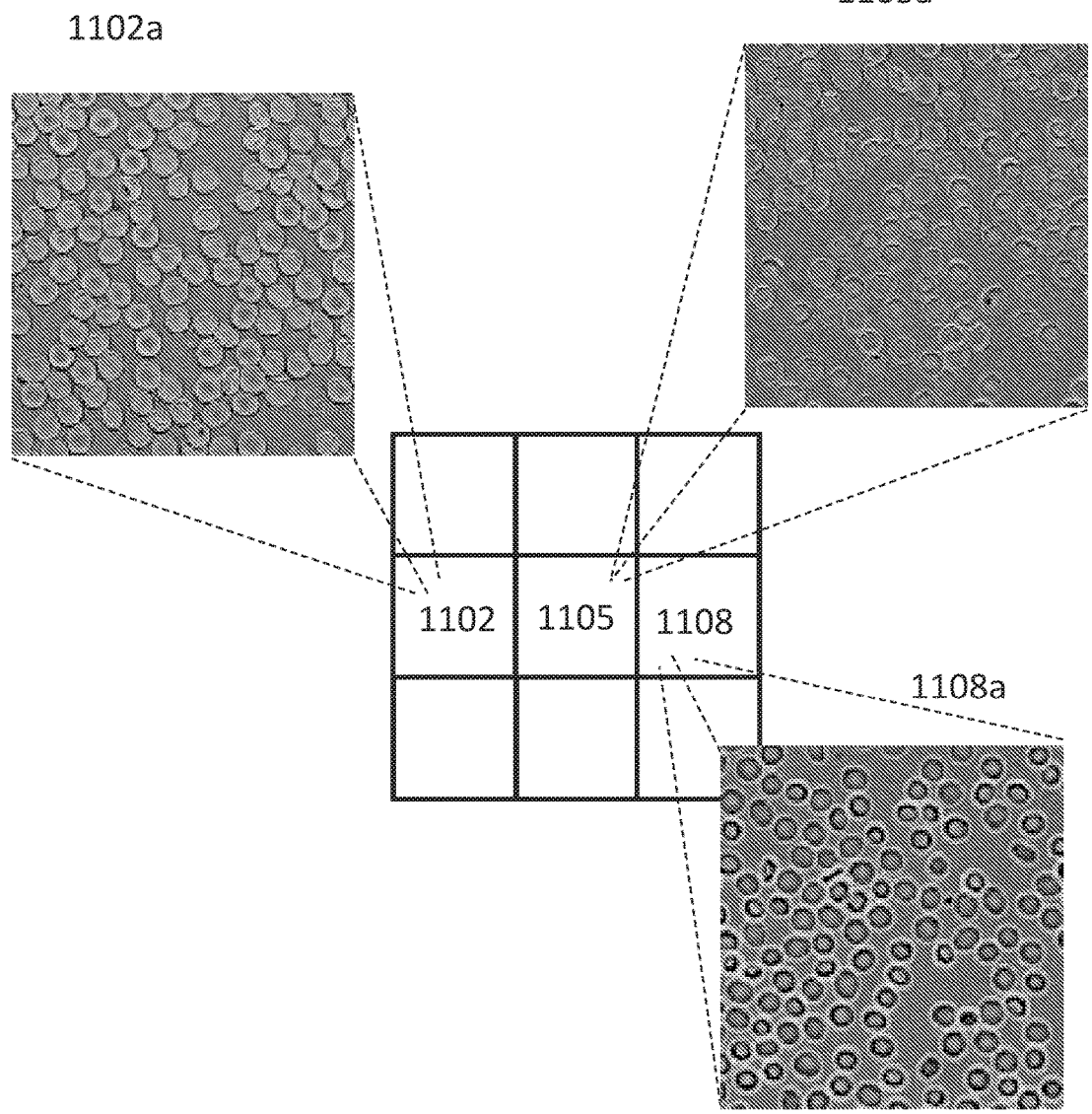
FIG. 13 illustrates a non-limiting example of variation in the appearance of objects in two or more focus analysis regions of a mapping field.

By way of a further non-limiting example, FIG. 13 shows images 1102*a*, 1105*a* and 1108*a* of red blood cells, the images captured within focus analysis regions 1102, 1105 and 1108, respectively. In image 1105*a*, the cells appear to be almost transparent, indicative of the cells being located at a depth of or near $Z_3$. In images 1102*a* and 1108*a*, the cells appear to be bordered by ring shapes. Furthermore, the cells in image 1102*a* appear to have a dark circumferential border with a white outer ring, while cells in image 1108*a* appear to have a white circumferential border with a dark outer ring. The appearance and colors of the ring shapes are indicative of a direction of the variation as well as the degree of variation, and can be used to define the focus configuration more precisely.

It is to be noted that the data indicative of focus variations within at least a portion of the sample chamber pertains to a mapping of the investigation plane of the cell sample with respect to the focal plane of the microscope. This data may be depicted and/or represented in any form that enables determination of differences between the focus configuration applicable to one focus analysis region with respect to the other focus analysis regions.

As indicated herein, when looking at a single mapping field within a sample chamber, it is expected that it will be essentially flat and linear, but possibly at an angle with respect to the focal plane of the microscope. However, due to various reasons, including optical distortion and background noise, in some cases, this expectation is not fulfilled. Therefore, in some cases, as indicated with respect to FIGS. 3A and 3B, a flat plane can be matched to the raw data indicative of focus variations. This may be performed for example using least squares regression, which finds the equation of a plane $z=ax+by+c$ that minimizes the sum of the square of vertical distance between the plane and the raw data indicative of focus variations.

It is to be noted that any distribution of the mapping fields as disclosed with respect to FIG. 2A is contemplated. It is to be further noted, when assuming the size of the focus analysis regions is constant, that the larger the area covered by the mapping fields is, the accuracy of the calculated focus configurations may be enhanced (which can have a positive effect inter alia on the accuracy of the diagnostic field analysis and/or on the determination of the diagnostic fields distribution within the cell sample). It can also be appreciated that the larger the area covered by the mapping fields is, the more time is required for calculating the focus configuration for the focus analysis regions. It is to be noted that in some non-limiting cases the mapping fields cover an area of up to fifty (50) percent of the diagnostic fields. Furthermore, in some non-limiting cases the mapping fields cover an area of up to ten (10) percent of the diagnostic fields. Still further, in some non-limiting cases the mapping fields cover an area of up to one (1) percent of the diagnostic fields.

In some cases, the data indicative of focus variations within a given mapping field can be utilized in order to extrapolate information of focus variations in areas not covered by the mapping field, using various known methods and/or techniques.

Once the data indicative of focus variations within a given mapping field is calculated, it can be stored, e.g. in data repository 420. The data can be represented by absolute values (e.g. values indicative of a relative position of the microscope and the microscope's investigation plane) or relative values (e.g. a difference between the focus configuration at a given location and a given reference focus configuration). In some cases the data indicative of focus variations within a given mapping field can be represented by a mathematical formulae or any type of map that can enable determination of a focus configuration at a given location within the sample carrier.

It is to be further noted that the data indicative of focus variations can be used to interpolate and/or extrapolate additional data indicative of focus variations, also in areas not covered by any mapping field.

In some cases, the system 400 can be configured to provide an error notification upon detection of any calculated focus configuration exceeding a given threshold. Exceeding such given threshold can indicate, for example, a problem associated with either one (or a combination of more than one) of the following: the microscope, the sample carrier, the positioning of the sample carrier within the microscope stage, or the cell sample.

As shown in FIG. 5, once the data indicative of focus variations within one or more mapping fields is calculated, it may be used, as further detailed herein, in one or more of: (a) controlling the capturing of the at least one image of one or more diagnostic fields detailed with respect to block 530; and (b) analyzing the images of the one or more diagnostic fields.

In some cases, the system 400 can be configured to capture a plurality of images of each diagnostic field for analysis/diagnosis thereof. In some cases, the images can be captured using the focus configuration calculated using one or more mapping fields, as detailed herein.

In some cases, the number of images captured for each diagnostic field (e.g. as detailed with respect to block 530) can be determined while taking into account the degree of focus variation within the diagnostic field. The degree of focus variation can be determined based on the focus configuration calculated for the focus analysis regions of one or more mapping fields (e.g. one or more mapping fields that cover the area that is closest to, or overlap, the area covered by the diagnostic field). For example, if the degree of focus variation (e.g. the difference between a focus configuration of a first focus analysis region and the focus configuration of a second focus analysis region) does not exceed a given threshold, only a single image of the diagnostic field can be acquired, while in other cases, two or more images of the diagnostic field may be acquired using different focus configurations. It is to be noted that while this may increase the time needed for acquiring the images and analyzing them, it may improve the accuracy of the diagnosis and may thus be preferred for some applications.

According to some examples of the presently disclosed subject matter, the system 400 can be configured to calculate a focus confidence score for at least two focus analysis regions (and in some cases for each focus analysis region) and/or a function that can provide such focus confidence score (e.g. given an indication of a certain focus analysis region). The focus confidence score can be indicative of a level of confidence in the focus configuration calculated for the corresponding focus analysis region. The focus confidence score can be represented by any scale (e.g. 0-1, 0-100, 1-10, or any other scale).

In some cases, the focus confidence score can be used as further detailed herein, in one or more of: (a) controlling the capturing the at least one image of one or more diagnostic fields detailed with respect to block 510; and (b) analyzing the images of the one or more diagnostic fields, as further detailed herein.

In some cases, the images can be analyzed using various computer vision and classification algorithms. In some cases, such algorithms can calculate a classification confidence score for the classifications calculated therewith. In some cases, such algorithms can calculate a classification confidence score, indicative of a level of confidence in the correctness of the calculated classification. In some cases, such a classification confidence score can be multiplied by the focus confidence score of the focus analysis region/s that is correlated with the corresponding areas of the diagnostic field (in some cases for that purpose the focus analysis regions are correlated with the corresponding areas of the diagnostic field using any method and/or technique). It is to be further noted that such multiplication can enable compensating for potential classification bias that may result from poor focus quality.

For example, a detection confidence map (or function), may provide for each grid area (or focus analysis region) a confidence score. The confidence score may be indicative of the quality or sharpness of a portion of a diagnostic image of a diagnostic field. A diagnostic image is captured at an imaging focus configuration that may be selected according to a focusing step using a focus field as described herein. However, since the diagnostic plane may not be perfectly parallel to the focal plane of the microscope, some grid areas (or focus analysis regions) may be out of focus to some extent (or have a lower image quality). The degree of this focus variation is correlated to the difference between a focus configuration that would have been used for imaging a specific grid area (taken alone) and the actual imaging focus configuration that was selected for imaging the diagnostic area encompassing the grid area. Thus, a confidence score can be a function of a distance between the imaging focus configuration selected for imaging the diagnostic field (based on a focus field for example) and the focus configuration that would have been applied if only the given grid area would have been imaged. Such distance can have an effect on the image quality and subsequently on the accuracy of a diagnostic analysis performed on the diagnostic image at a corresponding grid area (or focus analysis region). The confidence score may define a potential expected computer vision and classification algorithm (hereon, the algorithm) quality as a function of that area focus quality. This confidence score may be used by/integrated into the algorithm in several ways.

Optionally, the focus confidence score can be integrated into the algorithms in more complicated ways. One example is using the focus confidence score as a classifier of feature coordinates in the classification algorithms. In some cases, focus analysis regions having a focus configuration that is too far (e.g. according to a given threshold, that in some cases can be defined by the depth of focus (DOF)) from the imaging focus configuration calculated for the focus field of a given diagnostic field that is being analyzed can optionally be ignored by the classification algorithms. For example, focus regions that are at least 1 DOF above or below imaging focus configuration for a given field, may be ignored.

DOF is known as the distance between the nearest and farthest objects in a scene that appear acceptably sharp in an image. DOF is mostly a property of the microscope's objective lens and the magnification, the latter being determined by the resolution of interest. For example, for an object being about 1 μm in dimensions (e.g. schizonts or some platelets), a resolution of at least 0.5 μm would normally be required; similarly, for an object of about 2 μm in dimension, a resolution of at least 1 μm would normally be required. This also determines the magnification, and a magnification of at least 20× would be used for a resolution of about 0.5 μm, while a magnification of at least 10× would be used for a resolution of about 1 μm. in this connection, it is noted that a lens is chosen to provide a desired magnification. A lens is characterized by a numerical aperture (NA). For example, a lens for 20× magnification may have a numerical aperture (NA) of about 0.4-0.5, while a lens for 10× magnification may have a significantly smaller NA of about 0.2-0.25.

According to the Shillaber equation, DOF relates to NA for a given wavelength of light ($\lambda$) and medium refraction index (Ri):

$$DOF = \frac{\lambda\sqrt{Ri - (NA)^2}}{(NA)^2}$$

Below are provided non-limiting examples of DOF for several commercially available microscope objectives using 500 nm light and air as the medium (Ri=1.00) between microscope objective and object:

| Magnification | Numerical Aperture (NA) | Depth of Field (DOF) |
|---|---|---|
| 4x | 0.10 | 50 |
| 10x | 0.25 | 7.7 |
| 20x | 0.40 | 2.9 |
| 40x | 0.65 | 0.9 |
| 60x | 0.85 | 0.36 |
| 100x | 0.95 | 0.17 |

In some cases, when a suspect pathogen candidate is identified (e.g. when diagnosing a blood cell sample for the presence of a pathogen or when counting white blood cells in a cell sample) within an area of the diagnostic field that correlates with one or more focus analysis regions (in some cases for that purpose the focus analysis regions are correlated with the corresponding areas of the diagnostic field using any method and/or technique) having a focus confidence score lower than a given threshold or having a corresponding focus configuration that differs from a specific focus configuration used for acquiring the image or images of the diagnostic field by at least a threshold value, stricter scrutiny can be applied in analyzing the suspect candidate. For example, a new image or a set of images can be acquired at that location, at a calculated focus configuration having an improved focus confidence score (e.g. to confirm or negate the identification).

In some cases the focus configuration data can be used for selecting a portion of the diagnostic field for analysis, such that the focus variation between the specific focus configuration in which the image or images of the diagnostic field were acquired, and the focus configuration of the focus analysis regions within the portion, is below a specific threshold, e.g. 2-5 µm (non-limiting) or ±0.5-1 DOF.

Figure 10A:
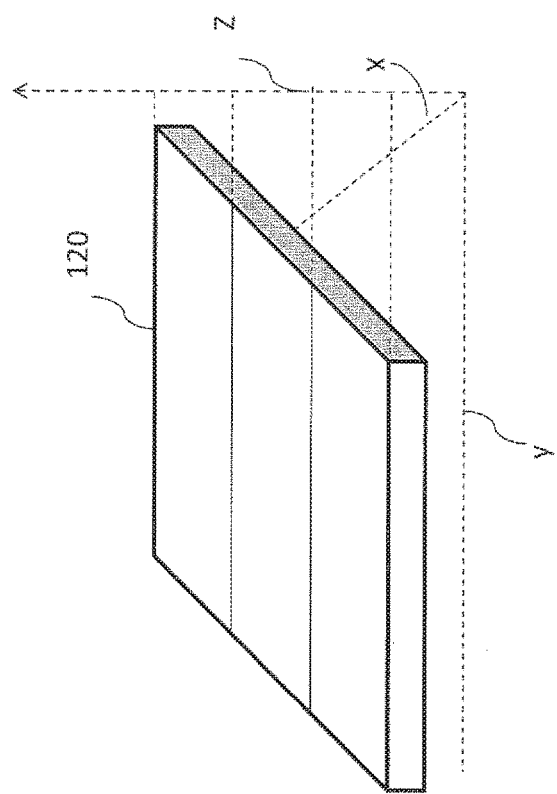
FIG. 10A is an illustration of an image having a slant on the X axis, and an example of a division thereof to diagnostic fields.
Figure 10B:
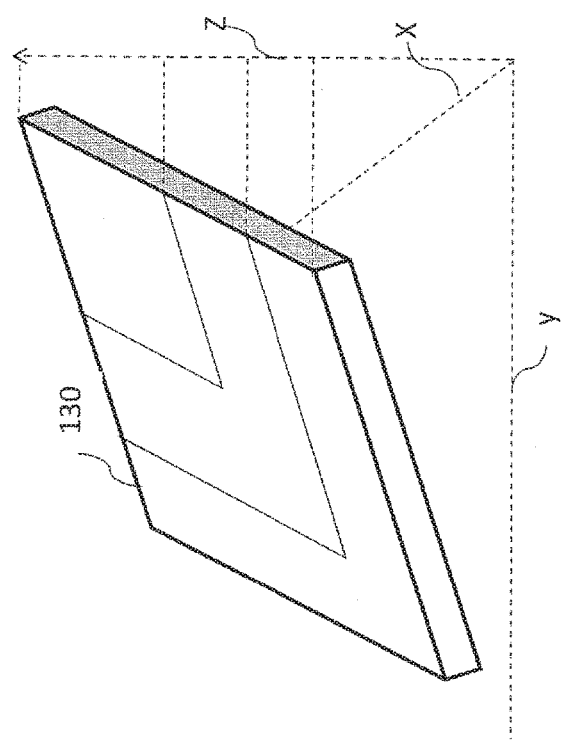
FIG. 10B is an illustration of an image having a slant on both the X and Y axis, and an example of a division thereof to diagnostic fields.

It is to be noted that in some cases, the confidence score can be used for determining the size and/or shape of one or more diagnostic fields. In FIGS. 10A and 10B, an optical plane of a microscope is parallel to the shown XY plane, with the z axis being the optical axis of the microscope. As an example shown in FIG. 10A, the more slanted the mapping field 120 is along the X axis, the diagnostic fields can be narrower strips of the image. If the slant is in the Y axis, the strips will be perpendicular to those of the X axis. In cases where both the X and Y axis are slanted, the diagnostic fields can sometimes be defined as L shaped, as shown for diagnostic field 130 in FIG. 10B. It is to be noted that this is a mere example and a diagnostic field's size and/or shape can be determined in other manners. One example of such an alternative is to use the confidence score for determining a size of a rectangle or an ellipse or any other shape.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 6 shows an illustration of a mapping field including a quality confidence score, in accordance with some embodiments of the presently disclosed subject matter.

In the illustrated example, there is shown a rectangular diagnostic field 610, split to twelve focus analysis regions (shown by a 3×4 table). Each focus analysis region has a corresponding focus configuration, where in the illustrated example the focus configuration is relative, however, as indicated above, this is by no means limiting. In addition to the focus configuration, each focus analysis region has a corresponding focus confidence score, having a value ranging from zero (e.g. for areas having a focus configuration that is less likely to be accurate) to one (e.g. for areas having a focus configuration that is most likely to be accurate). It is to be noted that the depicted illustration is by way of example only and is non-limiting.

Figure 7:
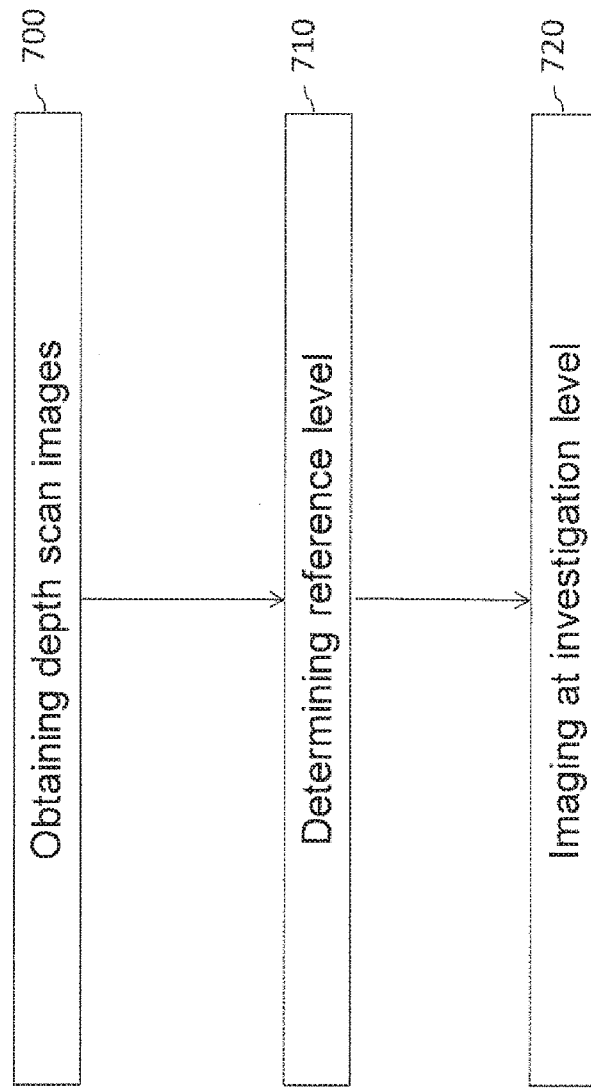
FIG. 7 is a flowchart illustrating steps of a method of imaging a cell sample, in accordance with some embodiments of the presently disclosed subject matter.

Attention is now drawn to FIG. 7, showing a flowchart illustrating steps of a method of imaging a cell sample, in accordance with some embodiments of the presently disclosed subject matter. The imaging method includes in a first stage, a method of determining a reference depth level within a cell sample and, in a second stage, focusing a digital microscope at an investigation level derived from the depth reference level. The method of determining a reference depth level may be carried out by system 400 (e.g. utilizing focus calculation module 440). Advantageously, the system 400, or parts thereof, may belong to an autofocus system of the microscope. The step of focusing the microscope may be performed automatically upon command by the autofocus system. The cell sample may comprise red blood cells and may optionally be a cell monolayer comprising red blood cells.

In 700, a series of images (also referred to as a set of images) representative of light captured by focusing a digital microscope at a corresponding series of depths levels within the cell sample is obtained. In some embodiments, obtaining the series of images comprises in-depth scanning of the cell sample with a digital microscope, for example by using an image sensor unit of the microscope connected with a computing module so as to provide the in-depth images (i.e. images captured during in-depth scanning) to the computing module. In some embodiments, in-depth scanning may be performed with brightfield illumination.

The set (series) of images may be understood as a series of slices of the cell sample corresponding to different positions along the Z axis (optical axis of the microscope). Each image may be associated with a depth level. Optionally one or more images are associated with depth levels within the cell sample that are above or below the cells in cell sample. Optionally one or more images are associated with depth levels that are above or below the cell sample. The set of images may result from an in-depth scanning of the cell sample. Such in-depth scanning may for example be carried out by varying a distance between a focus plane of the microscope and a sample carrier intended to accommodate the cell sample by methods well known in the art.

Further, the term depth level may be understood as a coordinate value along the optical axis of the microscope corresponding to a position that is optionally inside the cell sample. The actual direction of the axis and the origin of the axis to quantify depth may be arbitrarily chosen. The images may be obtained in any order, and may have an equal distance along the axis between pairs of consequent images or at a varying distance i.e. the in-depth scanning may be performed with a fixed step or with a variable step. For example, the origin of the axis may be positioned at an outer surface of the cell sample facing an objective of the microscope and the direction of the coordinate axis may be chosen so that the coordinates increase when progressing toward the cell sample. It is also understood that since the series of depth levels may be understood as an ordered set along the axis, it is possible to define endpoint depth levels (hereinafter referred to as endpoints) of the series of depth levels. As used herein, the term scanning depth interval refers to a series of depth levels between two endpoints' depth levels. One endpoint level of a series of depth levels, for example a minimum depth level of the set, may be referred to as a first scanning depth levels and the other endpoint of the set, for example the maximum depth level, may be referred to as a second scanning depth level. In such cases, the scanning depth interval refers to the depth levels comprised between the first and second scanning depth levels.

In some embodiments, an estimated reference depth level may be preliminarily provided. For example, the cell sample may comprise a plurality of fields to be investigated and reference depth levels determined for one or more previous fields may be used to estimate the estimated reference level for a subsequent field. In these embodiments, the scanning depth interval may be selected so as to cover the estimated depth reference level i.e. distances between the estimated depth reference level and the first and second scanning depth levels may be above a specific threshold. In some embodiments, a span of the depth scanning interval may be of around 5 micrometers to 1000 micrometers. In some embodiments, the span of the depth scanning interval may be between 150 and 250 micrometers, or less than 50 micrometers or even between 10 and 30 micrometers. Optionally, the estimated depth level is approximately in the midpoint of the span of the depth scanning interval.

In 710, the series of images and associated depth levels (or the data representative thereof) are processed for detecting at least one depth level corresponding to a drop in image contrast and the detected depth level is identified to be the reference depth level. The detected depth level may be such that an image contrast at the detected depth level is lower than the image contrast at the depth level immediately preceding and following the reference depth level (i.e. adjacent depth levels) in the series of depth levels. The drop in image contrast may be understood as a drop of image contrast over depth level (i.e. as a function of depth level). It is noted that when the contrast function used to calculate the image contrast is increasing with the contrast, 710 may be carried out by detecting a well of a contrast curve representing image contrast as a function of depth level. Image contrast of an image may be provided by applying a contrast function to the image. A well is considered to be formed on the contrast curve when a contrast function value is inferior at least to the previous and subsequent adjacent contrast function values. As used herein, some embodiments are described in which the image contrast is provided by the calculation of variance. It is understood that other functions can be contemplated to determine the contrast of an image. The set of images associated with the series of depth levels within the cell sample enables to analyze variations of an image parameter as a function of the depth level.

Figure 8:
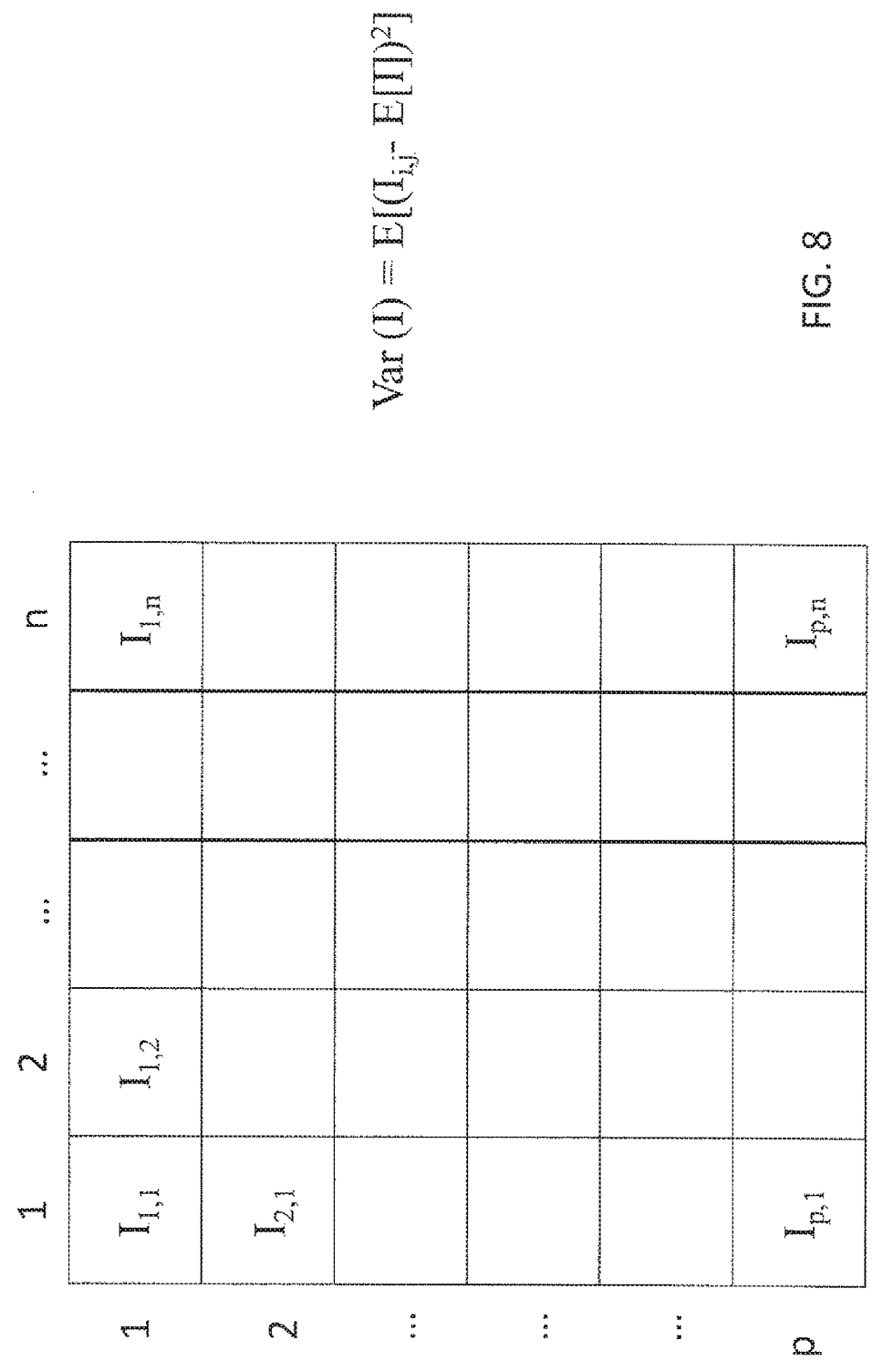

In some embodiments, image variance may be computed for every image of the set of obtained images. FIG. 8 illustrates image variance calculation on an example image I comprising n*p pixels (n, p integers) of pixel intensity $I_{i,j}$ wherein $1 \leq i \leq n$ and $1 \leq j \leq p$. The variance can be expressed as follows:

$$\mathrm{Var}(I) = E[(I_{i,j} - E(I))^2],$$

wherein E(I) is the mean value of the pixel intensity $I_{i,j}$ over the example image.

In some embodiments, a variance related value may be computed for each image of the set of images. It is understood that the variance related value encompasses transformations of the image variance enabling to derive the image variance i.e. transformations equivalent to image variance calculation, for example standard deviation.

It is understood that implementation of the present disclosure does not require generation of the actual curve representing the variation of the contrast function over depth level but that a search for a well (or a roof if the contrast function is decreasing with the contrast) can be performed mathematically using the image representative data.

In some embodiments, the cell sample may comprise predominantly red blood cells. In some embodiments, the cell sample may essentially be a monolayer of cells, wherein at least 80% of the cells or even at least 90% of the cells have direct contact with the surface on which the cell sample is held. In the context of imaging blood samples, the Applicant found that the proposed method based on determining a reference depth level corresponding to a minimum of variance (contrast and/or sharpness) over the in-depth scanning, may be particularly advantageous.

Indeed, the proposed method can be performed using brightfield illumination and can provide appropriate results for further investigation using fluorescent illumination. This may lead to reducing focus time because performing focus on fluorescent images is typically slower than when using brightfield, since obtaining fluorescent images typically requires longer exposure periods. Further, obtaining fluorescent images for focusing purpose may be problematic because fluorescent imaging is known to degrade the fluorescent response of the sample due to photo-bleaching.

Applying contrast-based functions and/or sharpness based functions to brightfield microscopy of a blood sample containing mostly red blood cells (for example a blood sample) may yield graphs qualitatively similar to that shown in FIG. 9. FIG. 9 illustrates a curve representing variations of image variance (image contrast) over scanning depth level. The curve notably comprises a well 37 embraced between two maxima 38, 39 (in this example a saddle point which is a local minimum, but not an absolute one).

The Applicant found that the depth level corresponding to the well 37 provides an efficient reference level providing robust and consistent results across different microscope hardware including different forms of brightfield illumination and different forms of sample preparation (dry thin smears, wet smears and microfluidic preparation). Moreover, a focus position based on the well 37 position provides a baseline for epifluorescent imaging.

Therefore, imaging at the reference depth level or in its vicinity may provide efficient parasite detection. The Applicant further found that the consistency of the focus generated by the proposed method of determining a minimum of the contrast function may be explained as follows: the maxima 38, 39 surrounding the well 37 typically fall within 1 micrometer of each other. Consequently, the well 37 is steep thereby causing discernible shifts in the contrast function even for shifts of depth level of about a tenth of a micron. It is appreciated that having a consistent reference level within a cell sample enables to establish reliable automated diagnosis.

Returning to FIG. 7, in 720 the digital microscope may be focused at an investigation level based on the determined reference level. In some embodiments, the investigation level may be equal to the reference level. In some embodiments, the investigation level may be shifted by a specific value with respect to the reference level. For example, this value may be in the range of 0.2-3 micrometers, or about 1-2 micrometers or about 1.5 micrometer. In some embodiments, switching to an investigation level that is different than the reference depth value enables to increase the contrast and/or sharpness of the image while preserving the consistency provided by the aforementioned method of determining a reference depth level. As explained above, focusing the microscope at the investigation level may enable to investigate the cell sample. In some embodiments, the investigation may be carried out with fluorescent illumination and/or with brightfield illumination. In some embodiments, the investigation level will provide a sharp image (or even the sharpest and/or highest contrast image).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Unless specifically stated otherwise, as apparent from the above discussions, it is appreciated that throughout the specification discussions utilizing terms such as "obtaining", "calculating", "detecting", "analyzing", "correlating", "capturing", "selecting" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 5-7 may be executed. In embodiments of the presently disclosed subject matter one or more stages illustrated in FIGS. 5-7 may be executed in a different order and/or one or more groups of stages may be executed simultaneously. FIG. 4 illustrates a general schematic of the system architecture in accordance with an embodiment of the presently disclosed subject matter. Each module in FIG. 4 can be made up of any combination of software, hardware and/or firmware that performs the functions as defined and explained herein. The modules in FIG. 4 may be centralized in one location or dispersed over more than one location. In other embodiments of the presently disclosed subject matter, the system may comprise fewer, more, and/or different modules than those shown in FIG. 4.

The invention claimed is:

1. A method, comprising:
obtaining, in a memory comprised in or operatively coupled to a digital microscope, data representative of at least one image of at least a portion of a cell sample, the at least one image acquired by a digital microscope, and the at least one image encompassing:
at least one mapping field, and
at least one diagnostic field, the at least one diagnostic field being different from the at least one mapping field;
using the obtained data, calculating data indicative of focus variation within the at least one mapping field;
capturing at least one image of the at least one diagnostic field; and
detecting an entity within the sample by analyzing the at least one captured image of the at least one diagnostic field,
the method comprising, using the calculated data that are indicative of focus variation within the at least one mapping field as an input for performing at least one action selected from the group consisting of: (a) controlling the capturing of the at least one image of the at least one diagnostic field, and (b) analyzing the at least one captured image of the at least one diagnostic field.

2. The method according to claim 1, wherein obtaining the data representative of at least one image of at least the portion of the cell sample comprises obtaining the data representative of the at least one captured image.

3. The method according to claim 1, wherein obtaining the data representative of at least one image of at least the portion of the cell sample comprises obtaining data representative of at least one image of at least the portion of the cell sample, the at least one image being a different image from the at least one captured image.

4. The method according to claim 1, wherein obtaining the at least one image comprises obtaining the at least one image, the at least one diagnostic field differing from the at least one mapping field in at least one parameter selected from the group consisting of: shape, size, and location.

5. The method according to claim 1, wherein the at least one diagnostic field is associated with at least one focus field, and wherein capturing at least one captured image of the at least one diagnostic field comprises using the focus field to calculate a focus configuration to be used for capturing the at least one image of the at least one diagnostic field.

6. The method according to claim 1, wherein using the calculated data that are indicative of focus variation within the at least one mapping field as an input for performing the at least one action comprises using the calculated data that are indicative of focus variation within the at least one mapping field as an input for selecting a parameter of the at least one diagnostic field selected from the group consisting of: a size of the at least one diagnostic field, and a shape of the at least one diagnostic field.

7. The method according to claim 1, wherein using the calculated data that are indicative of focus variation within the at least one mapping field as an input for performing the at least one action comprises using the calculated data that are indicative of focus variation within the at least one mapping field as an input for selecting to capture a plurality of images of the at least one diagnostic field.

8. The method according to claim 1, wherein using the calculated data that are indicative of focus variation within the at least one mapping field as an input for performing the at least one action comprises using the calculated data that are indicative of focus variation within the at least one mapping field as an input for selecting to capture a plurality of images of the at least one diagnostic field, each of the plurality of images being acquired at a respective, different focus configuration.

9. The method according to claim 1, wherein the at least one mapping field encompasses a plurality of focus analysis regions, and wherein calculating data indicative of focus variation within the at least one mapping field comprises calculating data indicative of focus variation between respective focus analysis regions.

10. The method according to claim 9, wherein using the calculated data that are indicative of focus variation within the at least one mapping field as an input for performing the at least one action comprises using the calculated data that are indicative of focus variation within the at least one mapping field as an input for calculating focus confidence scores indicative of levels of confidence in focus configurations calculated for respective focus analysis regions.

11. The method according to claim 10, wherein detecting an entity within the sample by analyzing the at least one image of the at least one diagnostic field comprises using a classification algorithm to classify the sample, and generating a classification confidence score associated with the classification of the sample, using the focus confidence scores as inputs.

12. The method according to claim 10, wherein detecting an entity within the sample by analyzing the at least one image of the at least one diagnostic field comprises:
   detecting a candidate of the entity within the sample that is associated with a focus confidence score that is lower than a threshold; and
   in response thereto, reimaging the candidate using different imaging parameters to those previously used to image the candidate.

13. The method according to claim 10, wherein using the calculated data that are indicative of focus variation within the at least one mapping field as an input for performing the at least one action further comprises using the focus confidence scores as inputs for performing the at least one action selected from the group consisting of: (a) controlling the capturing of the at least one image of the at least one diagnostic field, and (b) analyzing the at least one image of the at least one diagnostic field.

14. The method according to claim 13, wherein using the focus confidence scores as inputs for performing the at least one action comprises using the focus confidence scores as inputs for selecting a parameter of the at least one diagnostic field selected from the group consisting of: a size of the at least one diagnostic field, and a shape of the at least one diagnostic field.

15. Apparatus comprising:
   a digital microscope comprising:
      a memory configured to obtain data representative of at least one image of at least a portion of a cell sample, wherein the portion encompasses at least one mapping field, and at least one diagnostic field, the at least one diagnostic field being different from the at least one mapping field; and
      a computer processor configured to:
         calculate, using the obtained data, data indicative of focus variation within the at least one mapping field,
         capture at least one image of the at least one diagnostic field,
         detect an entity within the sample by analyzing the at least one captured image of the at least one diagnostic field, and
         use the calculated data that are indicative of focus variation within the at least one mapping field as an input for performing an action selected from the group consisting of: (a) controlling the capturing of the at least one image of the at least one diagnostic field, and (b) analyzing the at least one captured image of the at least one diagnostic field.

16. The apparatus according to claim 15, wherein the memory is configured to obtain the data representative of at least one image by obtaining the at least one image, the at least one diagnostic field differing from the at least one mapping field in at least one parameter selected from the group consisting of: shape, size, and location.

17. The apparatus according to claim 15, wherein the at least one diagnostic field is associated with at least one focus field, and wherein the computer processor is configured to capture the at least one image of the at least one diagnostic field by using the focus field to calculate a focus configuration to be used for capturing the at least one image of the at least one diagnostic field.

18. The apparatus according to claim 15, wherein the computer processor is configured to use the calculated data that are indicative of focus variation within the at least one mapping field as an input for performing the at least one action by using the calculated data that are indicative of focus variation within the at least one mapping field as an input for selecting a parameter of the at least one diagnostic field selected from the group consisting of: a size of the at least one diagnostic field, and a shape of the at least one diagnostic field.

19. The apparatus according to claim 15, wherein the computer processor is configured to use the calculated data that are indicative of focus variation within the at least one mapping field as an input for performing the at least one action by using the calculated data that are indicative of focus variation within the at least one mapping field as an input for selecting to capture a plurality of images of the at least one diagnostic field.

20. The apparatus according to claim 15, wherein the computer processor is configured to use the calculated data that are indicative of focus variation within the at least one mapping field as an input for performing the at least one action by using the calculated data that are indicative of focus variation within the at least one mapping field as an input for selecting to capture a plurality of images of the at least one diagnostic field, each of the plurality of images being acquired at a respective, different focus configuration.

21. The apparatus according to claim 15, wherein the at least one mapping field encompasses a plurality of focus analysis regions, and wherein the computer processor is configured to calculate data indicative of focus variation within the at least one mapping field by calculating data indicative of focus variation between respective focus analysis regions.

22. The apparatus according to claim 21, wherein the computer processor is configured to use the calculated data that are indicative of focus variation within the at least one mapping field as an input for performing the at least one action by using the calculated data that are indicative of focus variation within the at least one mapping field as an input for calculating focus confidence scores indicative of levels of confidence in focus configurations calculated for respective focus analysis regions.

23. The apparatus according to claim 22, wherein the computer processor is configured to detect an entity within the sample by analyzing the at least one image of the at least one diagnostic field by using a classification algorithm to classify the sample, and generating a classification confidence score associated with the classification of the sample, using the focus confidence scores as inputs.

24. The apparatus according to claim 22, wherein the computer processor is configured to detect an entity within the sample by analyzing the at least one image of the at least one diagnostic field by:
    detecting a candidate of the entity within the sample that is associated with a focus confidence score that is lower than a threshold; and
    in response thereto, reimaging the candidate using different imaging parameters to those previously used to image the candidate.

25. The apparatus according to claim 22, wherein the computer processor is configured to use the calculated data that are indicative of focus variation within the at least one mapping field as an input for performing the at least one action by using the focus confidence scores as inputs for performing the at least one action selected from the group consisting of: (a) controlling the capturing of the at least one image of the at least one diagnostic field, and (b) analyzing the at least one image of the at least one diagnostic field.

26. The apparatus according to claim 25, wherein the computer processor is configured to use the focus confidence scores as inputs for performing the at least one action by using the focus confidence scores as inputs for selecting a parameter of the at least one diagnostic field selected from the group consisting of: a size of the at least one diagnostic field, and a shape of the at least one diagnostic field.

27. A method, comprising:
    obtaining, in a memory comprised in or operatively coupled to a digital microscope, data representative of at least one image of at least a portion of a cell sample, the at least one image acquired by a digital microscope;
    using the obtained data, calculating focus configurations to be used for acquiring images of the cell sample or parts thereof by the digital microscope;
    determining that a calculated focus configuration exceeds a given threshold; and
    in response thereto, generating an error message indicative of an error selected from the group consisting of: an error in the microscope, an error in the sample carrier, an error in positioning of the sample carrier with respect to a portion of the microscope, and an error in the cell sample.

* * * * *